US011432478B2

(12) United States Patent
Freeman

(10) Patent No.: US 11,432,478 B2
(45) Date of Patent: Sep. 6, 2022

(54) FILM DEPLOYER, IMPROVED TRASH WHIPPER AND IMPROVED PLANTER

(71) Applicant: NORSEMAN MACHINERY IMPORTS PTY LTD, Toowoomba (AU)

(72) Inventor: Michael Freeman, Toowoomba (AU)

(73) Assignee: NORSEMAN MACHINERY IMPORTS PTY LTD, Toowoomba (AU)

( * ) Notice: Subject to any disclaimer, the term of this patent is extended or adjusted under 35 U.S.C. 154(b) by 337 days.

(21) Appl. No.: 16/482,281

(22) PCT Filed: Feb. 15, 2017

(86) PCT No.: PCT/AU2017/050125
§ 371 (c)(1),
(2) Date: Jul. 31, 2019

(87) PCT Pub. No.: WO2018/148776
PCT Pub. Date: Aug. 23, 2018

(65) Prior Publication Data
US 2019/0364747 A1 Dec. 5, 2019

(30) Foreign Application Priority Data
Feb. 14, 2017 (WO) ................ PCT/AU2017/050123

(51) Int. Cl.
*A01G 13/02* (2006.01)
*A01B 29/04* (2006.01)
(Continued)

(52) U.S. Cl.
CPC .......... *A01G 13/0287* (2013.01); *A01B 29/04* (2013.01); *A01B 29/06* (2013.01);
(Continued)

(58) Field of Classification Search
CPC .... A01G 13/0287; A01B 29/04; A01B 29/06; A01B 35/16; A01B 35/18; A01B 49/06; A01C 5/066
See application file for complete search history.

(56) References Cited

U.S. PATENT DOCUMENTS

| 641,030 A | 1/1900 | Murray |
| 1,787,902 A | 1/1931 | Herfort |
(Continued)

FOREIGN PATENT DOCUMENTS

| DE | 29 44 362 A1 | 5/1980 |
| FR | 2580459 | 10/1986 |
| FR | 2617674 | 1/1989 |

*Primary Examiner* — Tara Mayo-Pinnock
(74) *Attorney, Agent, or Firm* — WC&F IP

(57) ABSTRACT

The present invention provides a ground engaging film roller 30.2 having a generally horizontal axis of rotation and an outer circumference for engaging ground, the roller having opposed outer ends 30.21 of a larger circumference than the circumference of portions 30.22 located between the opposed ends.

The present invention also provides a film deployment system having a ground engaging film roller as described above, which is rotationally mounted to a frame 30.1, the ground engaging film roller 30.2 receiving film from above and to a front location of the roller, and passing between a film locating roller 30.3 and the ground engaging roller 30.2, the ground engaging roller 30.2 shaping the ground it engages by forming a channel in ground at the opposed ends 30.21 of the roller 30.2 for the film to be located as it leaves engagement with the ground engaging roller 30.2.

The present invention also provides an agricultural or horticultural implement 10, 30 for performing an agricultural or horticultural process, the implement 10,30 including whipper arrangement 50 at a location forward of where the process will be performed.

(Continued)

The agricultural or horticultural implement 10, 30 can be such that to the rear of where the process is performed there can located film deployment system 30 as described above.

19 Claims, 19 Drawing Sheets

(51) Int. Cl.
  *A01B 35/16* (2006.01)
  *A01C 5/06* (2006.01)
  *A01B 29/06* (2006.01)
  *A01B 49/06* (2006.01)
  *A01C 7/00* (2006.01)

(52) U.S. Cl.
  CPC .............. *A01B 35/16* (2013.01); *A01B 49/06* (2013.01); *A01C 5/064* (2013.01); *A01C 5/066* (2013.01); *A01C 7/006* (2013.01)

(56) References Cited

U.S. PATENT DOCUMENTS

| | | | |
|---|---|---|---|
| 3,180,290 A | | 4/1965 | Kappelmann et al. |
| 3,234,691 A | | 2/1966 | Cowell |
| 3,293,797 A | | 12/1966 | Kappelmann et al. |
| 3,559,599 A | | 2/1971 | Hoadley |
| 3,791,321 A | * | 2/1974 | Tsutsumi ............... A01C 11/00 111/102 |
| 4,513,530 A | | 4/1985 | Nyboer |
| 4,953,482 A | * | 9/1990 | Emily ................ A01G 13/0287 111/144 |
| 5,443,127 A | | 8/1995 | Gates |
| 5,461,995 A | | 10/1995 | Winterton |
| 6,094,858 A | | 8/2000 | Shine |
| 7,188,447 B2 | | 3/2007 | Rose et al. |
| 7,861,660 B2 | | 1/2011 | Martin |
| 8,393,407 B2 | | 3/2013 | Freed |
| 8,839,726 B2 | | 9/2014 | Buskirk et al. |
| 2010/0239372 A1 | | 9/2010 | Flores et al. |
| 2012/0017813 A1 | | 1/2012 | Buskirk et al. |
| 2015/0156963 A1 | | 6/2015 | Choe |

* cited by examiner

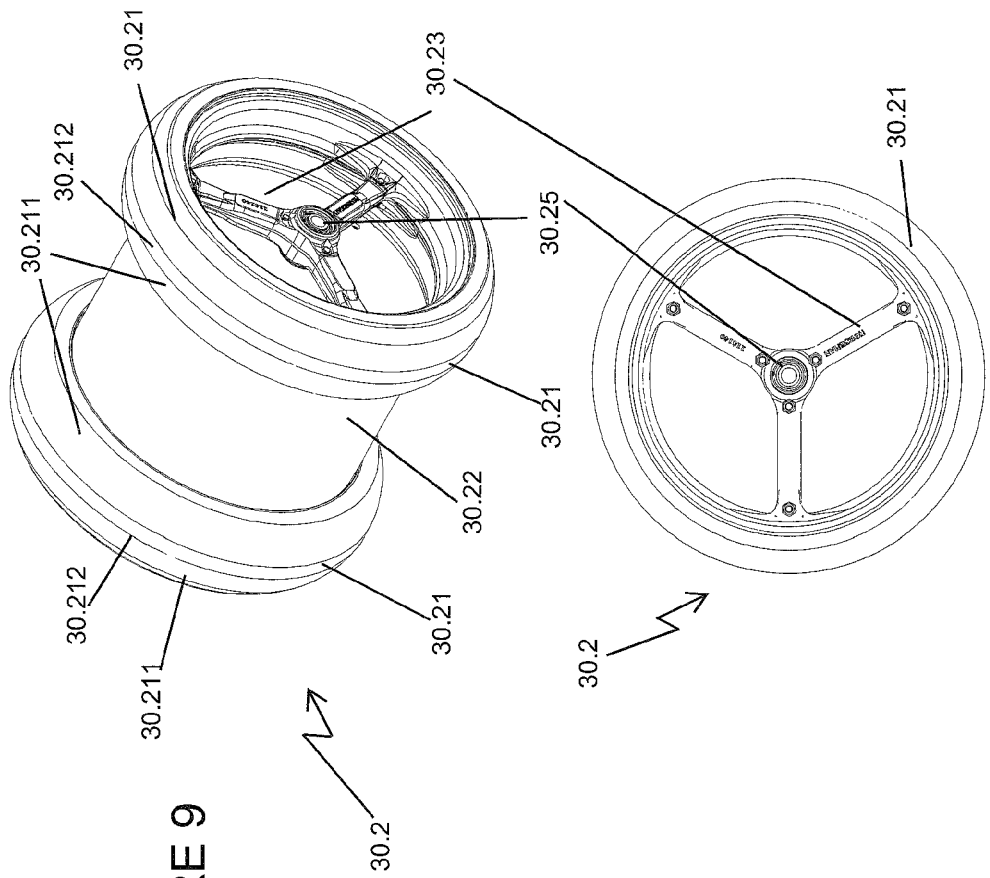
FIGURE 9
FIGURE 10
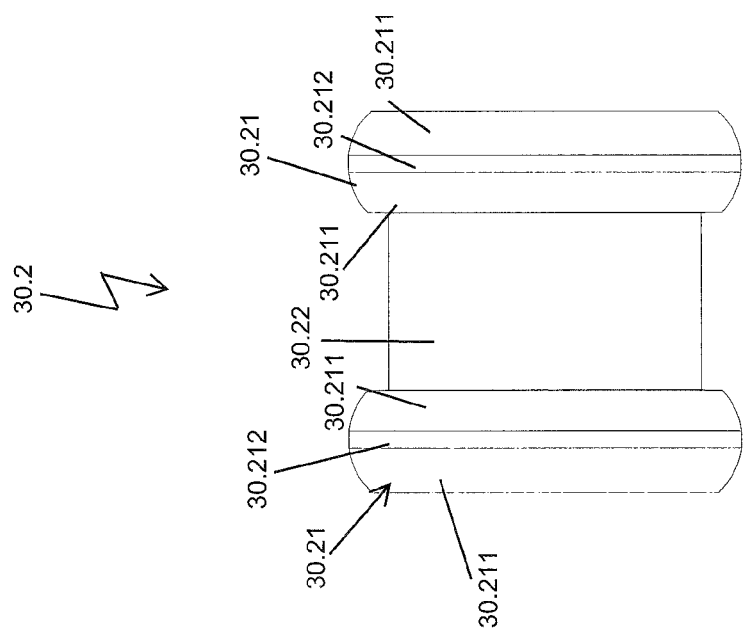
FIGURE 8

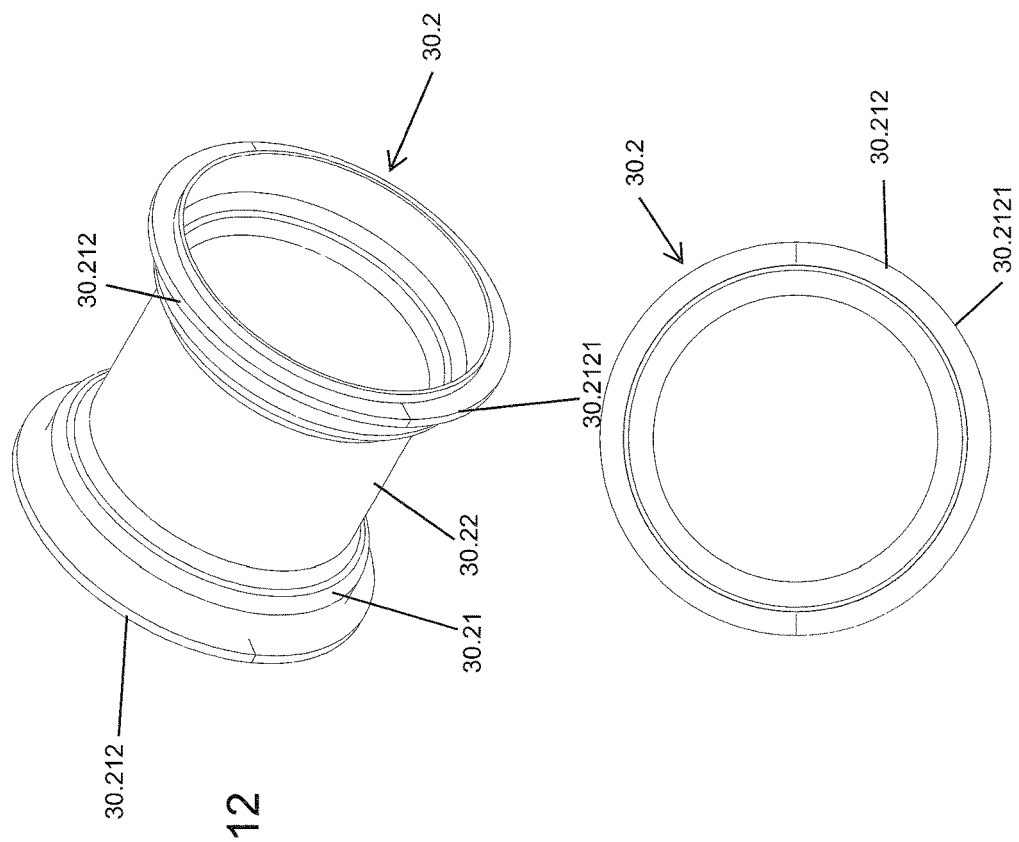
FIGURE 12
FIGURE 13
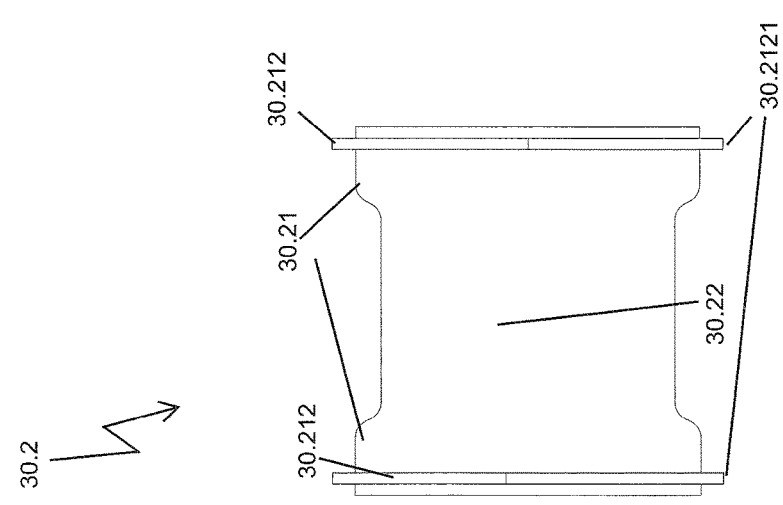
FIGURE 11

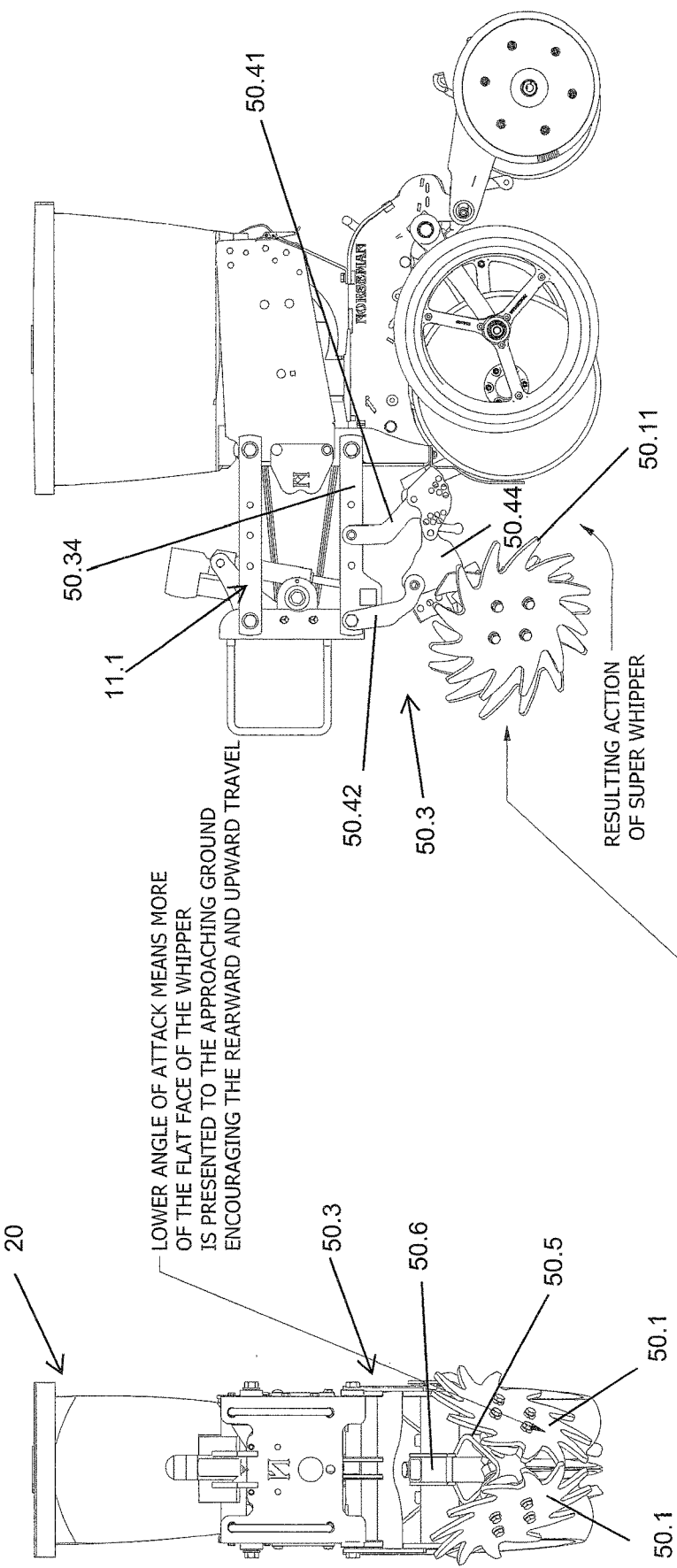

FILM DEPLOYER, IMPROVED TRASH WHIPPER AND IMPROVED PLANTER

FIELD OF THE INVENTION

The present invention relates to film deployer systems which can be used in agriculture and or horticulture, and to trash whippers which function as row cleaners to assist in a planting or other operation, and to a seed planting machine having such an improved film deployers and trash whipper.

BACKGROUND OF THE INVENTION

Many film deployers have been the subject of patent applications in the past. Some of these have been introduced into the market. A common problem with such film deployers is that the process of deploying the film is readily disrupted by wind and the effects of wind on the film as it is being deployed. These effects of wind are exacerbated by moving the deployer quickly, which has the effect that deployers have to travel at relatively low speeds which increases the cost to the deployment process. Additionally prior art deployers required a deep tilled flat paddock, and as such cannot operate in preformed furrow irrigation systems.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a ground engaging film roller having a generally horizontal axis of rotation and an outer circumference for engaging ground, the roller having opposed outer ends of a larger circumference than the circumference of portions located between the opposed ends.

The opposed outer ends can each be adapted to form a channel into which a respect edge of a film layer will be located when deployed.

The opposed outer ends can be adapted to push and or place opposed ends of film into engagement with ground.

The opposed outer ends can include film insertion rims.

The opposed outer ends can have a polymeric or rubber based outer circumferential surfaces for engaging film to be deployed.

The ground engaging roller can have one or more of the following features: opposed outer ends have a shape which is generally rounded in cross section; opposed outer ends have a shape which is has rounded sides and an intermediate straight portion in cross section or then viewed from the front; portions between the opposed outer ends are generally cylindrical.

The present invention also provides a film deployment system having a ground engaging film roller as described above, which is rotationally mounted to a frame, the ground engaging film roller receiving film from above and to a front location of the roller, and passing between a film locating roller and the ground engaging roller, the ground engaging roller shaping the ground it engages by forming a channel in ground at the opposed ends of the roller for the film to be located as it leaves engagement with the ground engaging roller.

There can be positioned near to the opposed ends of the ground engaging roller one or more of the following: an insertion disc which is adapted to simultaneously form a deeper channel in the channel by the ground engaging roller and to push the film into the deeper channel; an insertion disc the position of which adjustable laterally so as to position same at different parts of the channel formed by the opposed ends of the ground engaging roller; an insertion disc which cooperates with a scraper; an insertion disc which cooperates with a shielding brush; an insertion disc which follows the opposed ends of the ground engaging rollers which dictates the width of clear film left exposed above soil, after the system has passed.

There can be one or more coulters arranged so that soil not covered by the film is moved towards the edges of the film and engage the outboard face of the insertion disc, and the soil is thereby prevented from moving past the disc, to fill the channel and thereby overlie and hold the edges of the film captive in the ground.

The one or more coulters can be one or more of the following: a pair of coulters on each side of the roller; a covering coulter on each side of the film; a covering coulter forward of the insertion discs on each side of the film; a covering coulter forward of the insertion discs on each side of the film mounted on a spring biased arm; a shaping coulter on each side of the film which is rear of the axis of rotation of the insertion disc.

To the rear of the system there can be located a film engaging spade which is adapted to engage and or sever the film when actuated by an operator or control system. Additionally the spade can assist with the securing of the film at the start of a film laying run.

The system can be located in one or more than one of the following: a film deploying implement which is adapted to deploy film; a seed planter having a trailing film deploying implement or system; agricultural or horticultural process implement having a trailing film deployment implement or system; a film deploying implement in which there is located a weight pin mechanism which detects how much weight is being carried and or applied to the ground by the film deployment implement, and compensates by application of hydraulic pressure to a hydraulic cylinder to apply a desired weight to be carried and or applied to the ground.

The system can include one or more racks to carry replacement rolls of film to replenish the system once film has been fully deployed.

The present invention further provides an improved trash whipper arrangement comprising a pair of angularly oriented ground engaging whipper coulters mounted to a forward end of a pivoted four bar linkage which has two stationary pivots mounted to a support which carries the whipper, which when in use has the two stationary pivots located in a generally horizontal plane.

The four bar linkage moves the coulters both rearwardly and upwardly relative to the support in the event that the whipper in use engages an obstacle, or because of forces generated by the whipper coulters.

The coulters of the whipper arrangement can be arranged to rotate around axes which are at an angle to the horizontal plane and have a component of direction which is in the direction of movement of the arrangement when it is moving.

The whipper arrangement coulters can include one or more than one of the following: teeth on an outer circumference thereof, the rotation axes of respective coulters are set so as to provide a surface of the coulter which will act as an inclined plane in the direction of travel, which function to apply a lifting force to the coulters as the coulters travel through ground.

The present invention also provides an agricultural or horticultural implement for performing an agricultural or horticultural process, the implement including whipper arrangement as described above at a location forward of where the process will be performed.

The agricultural or horticultural implement can be such that to the rear of where the process is performed there can located film deployment system as described above.

The agricultural or horticultural implement can be such that the process can be one or more of the following: seed planting; fertilizing; weed treatment, insecticide treatment; any other appropriate agricultural or horticultural process.

BRIEF DESCRIPTION OF THE DRAWINGS

A detailed description of a preferred embodiment will follow, by way of example only, with reference to the accompanying figures of the drawings, in which:

FIG. 8 illustrates a front view of a ground engaging film roller;

FIG. 9 illustrates a perspective view of the ground engaging film roller of FIG. 8;

FIG. 10 illustrates a side view of a ground engaging film roller of FIG. 8;

FIG. 11 illustrates a front view of another ground engaging film roller;

FIG. 12 illustrates a perspective view of the ground engaging film roller of FIG. 11;

FIG. 13 illustrates a side view of the ground engaging film roller of FIG. 11;

FIG. 17 illustrates a front perspective view of the combined seed planter and trash whipper assembly;

FIG. 18 is a side view similar to FIG. 15 indicating the direction of travel of the trash whipper relative to its mounting location;

DETAILED DESCRIPTION OF THE EMBODIMENT OR EMBODIMENTS

Figure 1:
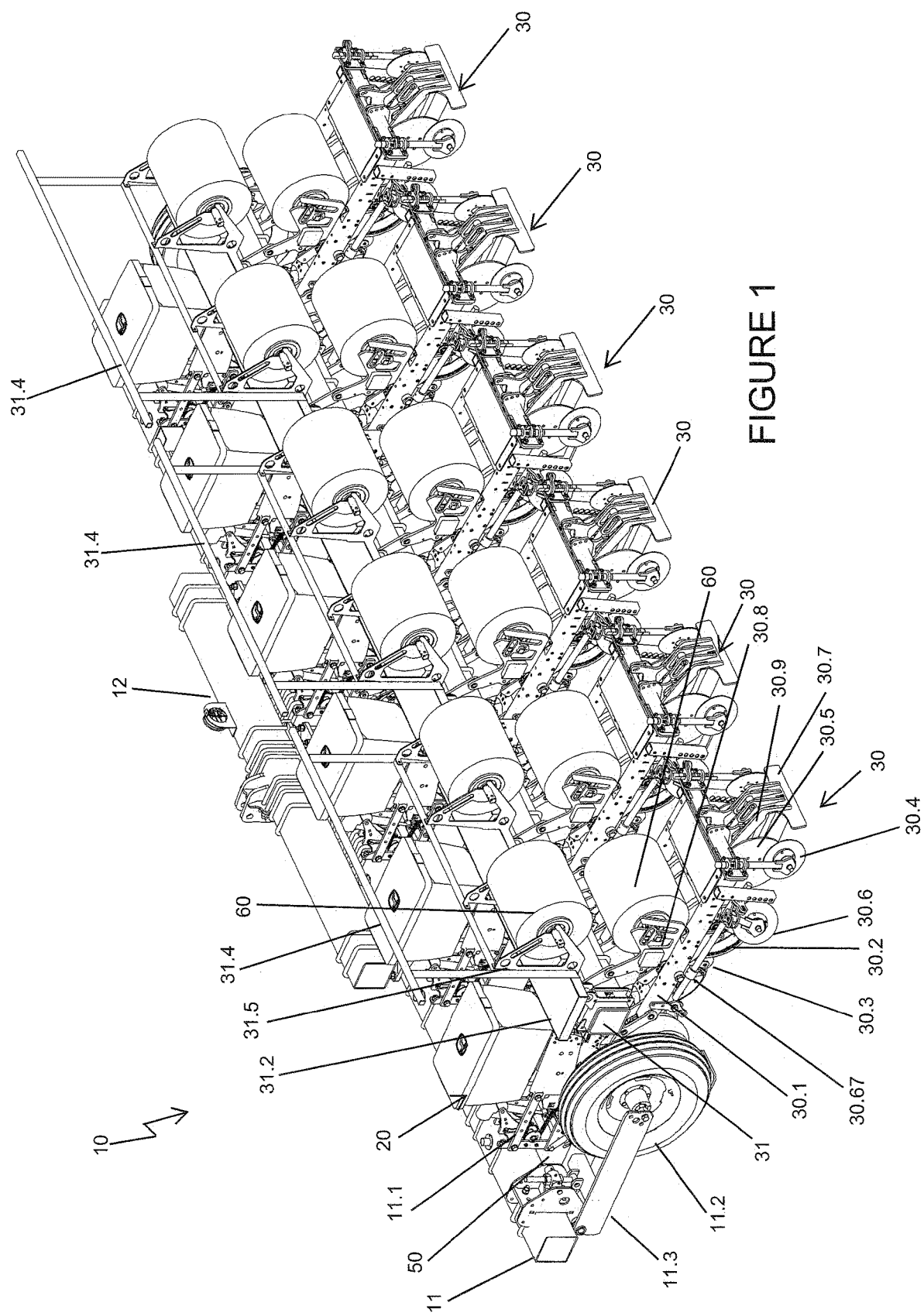
FIG. 1 illustrates a perspective view of a six row, combined seed planter and film deployment system.

Illustrated in FIGS. 1 and 3 to 5 is an implement 10 being 6 row system where each row has a seed planter 20 and a trailing film deployer 30, and forward located trash whipper 50. The seed planter 20 can be any seed planter such as known in the agricultural industry. While the implement 10 is illustrated with a seed planter 20, it will be readily understood that the trash whipper 50 and or the film deployer 30 can be used with any agricultural or horticultural implement which must apply an agricultural or horticultural process to a field. Such processes can be seed planting; fertilizing; weed treatment, insecticide treatment; furrow formers; or any other appropriate agricultural or horticultural process. It will also be understood that the film deployer 50 can also be used on its own in a film deployment implement.

The implement 10 has the seed planters 50 mounted to the tool bar 11 by a parallel linkage or 4 bar pivoted linkage 11.1. The lowest linkage of the linkage 11.1 has the trash whipper 50 is mounted to as will be described in detail below. The tool bar 11 has a weight carrying wheel 11.2 on mounting arm 11.3 which is actuated by a hydraulic cylinder (not illustrated) to be rotated so as to lift or lower the when 11.2 by the operator of a tractor, which will provide operation power for and motive power for the implement 10. Depending upon the implement 10, the wheels 11.2 may be used for height adjustment of the implement 10.

To the rear of the seed planter 20 is a film deployer tool bar 31 to which the film deployer 30 is mounted by means of a parallel linkage or 4 bar pivoted linkage 31.1. If desired another linkage system could be used, such as a swing arm, but a four bar linkage is preferred because it ensures that the orientation of the components of implement 30, relative to the ground, remain in a desired orientation in use. The linkage 31.1 connects to a chassis or frame 30.1 which carries a single ground engaging film roller 30.2, a pair of biased film locating rollers 30.3, a pair of covering coulters 30.6, a pair of discs 30.5 which are both rotary shields and insertion discs, a pair of shaping coulters 30.4, a pair of shielding brushes 30.9 and a rear located hydraulically actuated spade 30.7. On top of the frame 30.1 is a film roll cradle 30.8 which holds a film roll 60.

Above the film deployer drawbar 31 is mounted a walkway 31.2 and a series of three hand rails 31.4, and rearwardly off the frame of the hand rails 31.4 are pairs of brackets 31.5, which receive a spare roll 60, for replacing the lower roll 60 which is having its film installed or deployed, when it runs out of film. If desired the upper horizontal or extended brackets 31.5 can be provided so that a second spare roll can also be carried. An advantage of the implement 11 over prior art film deployers is that an operator manageable size roll of film 60 is utilised, and down time is minimised in the field as a single operator is able to replace the film rolls without the use of lifting equipment. Additionally, one stint in the field allows deployment of two or three rolls for each row to be installed or deployed before having to leave the field or be re-supplied with new rolls 60.

Figure 2:
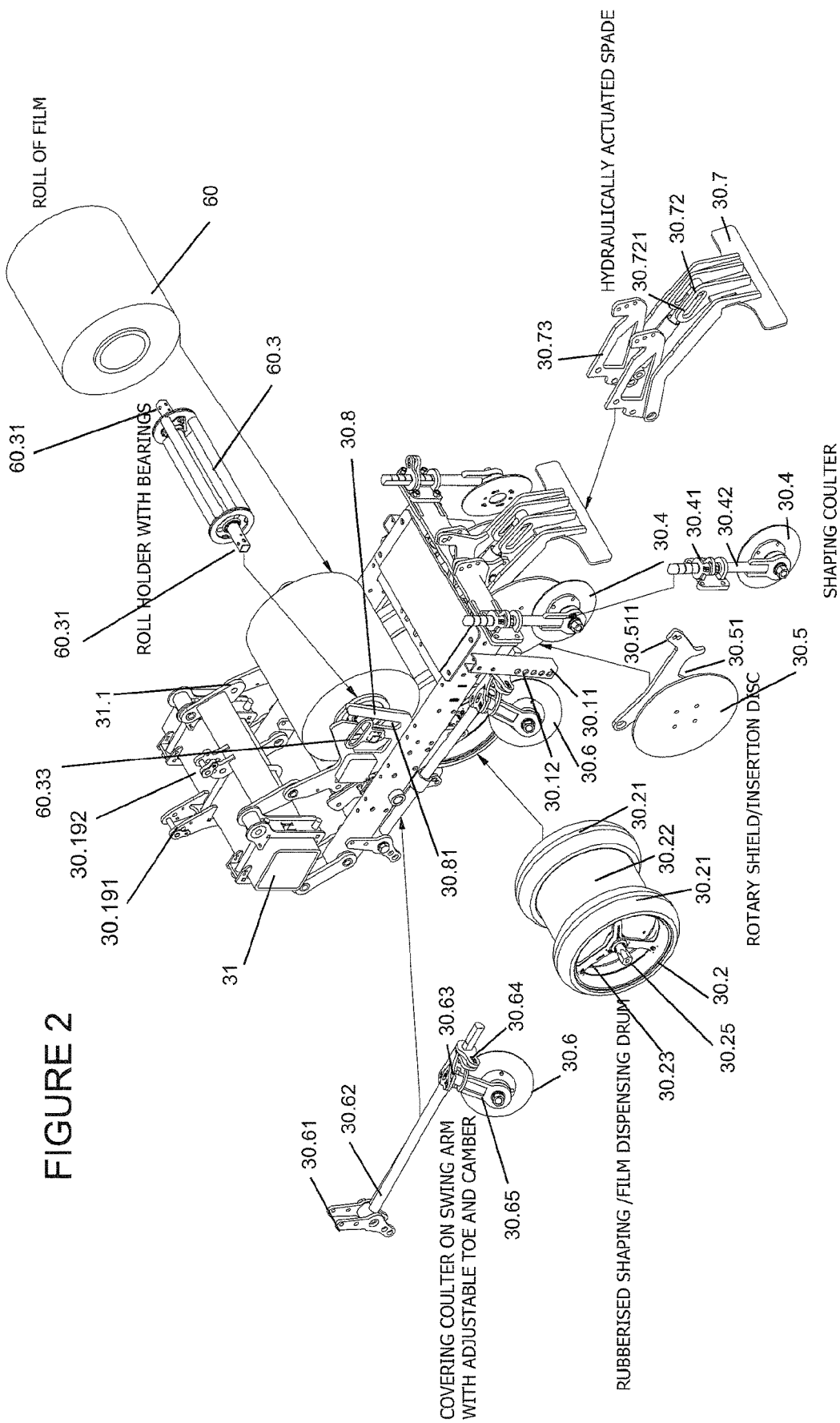
FIG. 2 illustrates a detailed perspective view of a one row film deployment system of FIG. 1, and an exploded view of the components of the system.

As best illustrated in FIGS. 1 and 2, the roll cradle 30.8 receives the roll of film 60 to be deployed. The roll cradle 30.8 is mounted to the upper edge of the frame 30.1, and has a vertical slot 30.81 to receive the square ends 60.31 of the axle of the roll holder and bearings 60.3. The square ends 60.31 are located in slot 30.81 so that as the roll 60 unwinds the film for deployment, the roll holder 60.3 will move downwardly in the slot 30.81, so that the outer circumference of the roll 60 maintains engagement with the outer ends 30.21 of ground engaging film roller 30.2. This assists in ensuring that the film is never under tension and is never air borne, and further as the film roll 60 only feeds out when the roller 30.2 is rotating, no over running or excess feed out of film occurs, because the roller 30.2 also acts as a brake on the film roll 60. Removable handles 60.33 having square apertures are provided so that the operator or two operators can readily lift a combined roll 60 and roll holder 60.3 and position same in the cradle 30.8 on frame 30, or in the spare roll racks 31.5.

The film deployer system or implement 50 will now be described in more detail with reference to FIG. 2 and FIGS. 8 to 10. The deployer system or implement 50 has the ground engaging film roller 30.2 which is constructed from a shaped drum which has a generally horizontal axis of rotation or axis 30.25 and an outer circumference for engaging the ground which is to receive film. The roller 30.2 has opposed outer ends 30.21 which are of a larger diameter than the diameter of portion 30.22, which is located between the opposed ends 30.21. The construction of the roller 30.2 can be by any known method. For example it may be fabricated from metals such as steel or aluminium as a cylindrical drum, to which larger outside diameter ends 30.21 are added later. Another manufacturing method would be to mould the roller 30.2 from appropriate polymeric material, however a steel or aluminium drum is expected to better stand up to the treatment that agricultural implements generally receive during use.

The opposed outer ends 30.21 have a rubberised outer surface for making contact with the film from the roll 60. This can be done by applying a layer of rubber to the outer ends 30.21, which follows the contours of the roller 30.2 to form the bulbous or part circular shape of the ends, or if desired, a solid, or inflatable, rubberised "tyre" (or one of appropriate polymer) or similar, which will form the bulbous or part circular shape of the ends 30.21, can be applied to the cylindrical ends of a cylindrical drum to form the shaped roller 30.2. Rubber is chosen because of its affinity with the preferred film to be dispensed by the film roller 60. The implement 30 is designed to lay film between the range of 8 to 20 microns in thickness. While the width of the role is chosen based on crop to be covered etc., the implement 30 described herein has a roll 60 which is approximately 425 mm in width. Preferably the film used also has a series of angled slits pre-formed therein along its length, but they could be formed perpendicular to the length of the film. Such film can be manufactured from a starch or polylactic acid, oxo-biodegradable, polybutylene succinate, polycaprolactone, as well as polyethylene (PE, LDPE, LLDPE, HDPE) and polypropene films. Preferably the film is biodegradable. Instead of rubber being used, it may be possible to line or coat the ends 30.21 of the roller 30.2 with a silicone based material or polymer. However the material chosen needs to work like rubber in that it assists the film in gripping the roller ends 30.21. This, together with the fact that the roll 60 is driven by ends 30.21 and only rotates when ends 30.21 are rotating, ensure that film gets to the roller 30.2 without any tension being involved, and passes over the roller 30.2 without any tension being applied to the film. This keeps the film safe from wind, and safe from the risks of tearing that tension applied to the film would otherwise cause.

The opposed outer ends 30.21 will form a respective channel into the ground as it lays down, or pushes the film into place, so that a respective edge of a film layer will be located in the channel when deployed.

From FIGS. 2, 8 and 9 it can be seen that the ground engaging roller 30.2 has its opposed outer ends 30.21 which have a shape which is generally rounded in cross section. Additionally as best seen from the FIG. 8 the opposed outer ends 30.21 have a shape which is has rounded outer sides 30.211 and an intermediate straight portion 30.212 in cross section or when viewed from the front. The straight portions 30.212 provide a good bearing surface for the idling and biased film locating roller 30.3, to roll against. It will be noted that the portions 30.22 between the opposed outer ends are generally cylindrical. By appropriate pressure being applied by the implement to press the roller 30.2 into a row in the ground which has just been planted the row is given a finished shape which help the row formation to perform its functions of draining and protection while seedlings form. While the roller 30.2 is illustrated as having a three spoke constructions, any appropriate hub constructions and or drum constructions, for example having closed ends, can be utilised.

Illustrated in FIGS. 11 to 13 is a modified roller 30.2 which is illustrated as having larger diameter outer ends 30.21. Also included are film insertion rims 30.2121 attached to the outer ends 30.21, which also have a flat or cylindrical outer circumference 30.212 against which the film locating roller 30.3 can bear against. The film insertion rims 30.2121 could be formed of rubber or rubberised components, or made from steel or aluminium (depending on the material from which the rest of the drum is made) and coated with a rubberised compound or a rubberised or rubber "tyre" attached to the rims 30.2121. The roller 30.2 of FIGS. 11 to 13 could also be used without the insertion rims 30.2121, and whereby a flat rubberised band or coating is applied to the outer ends 30.21.

Figure 4:
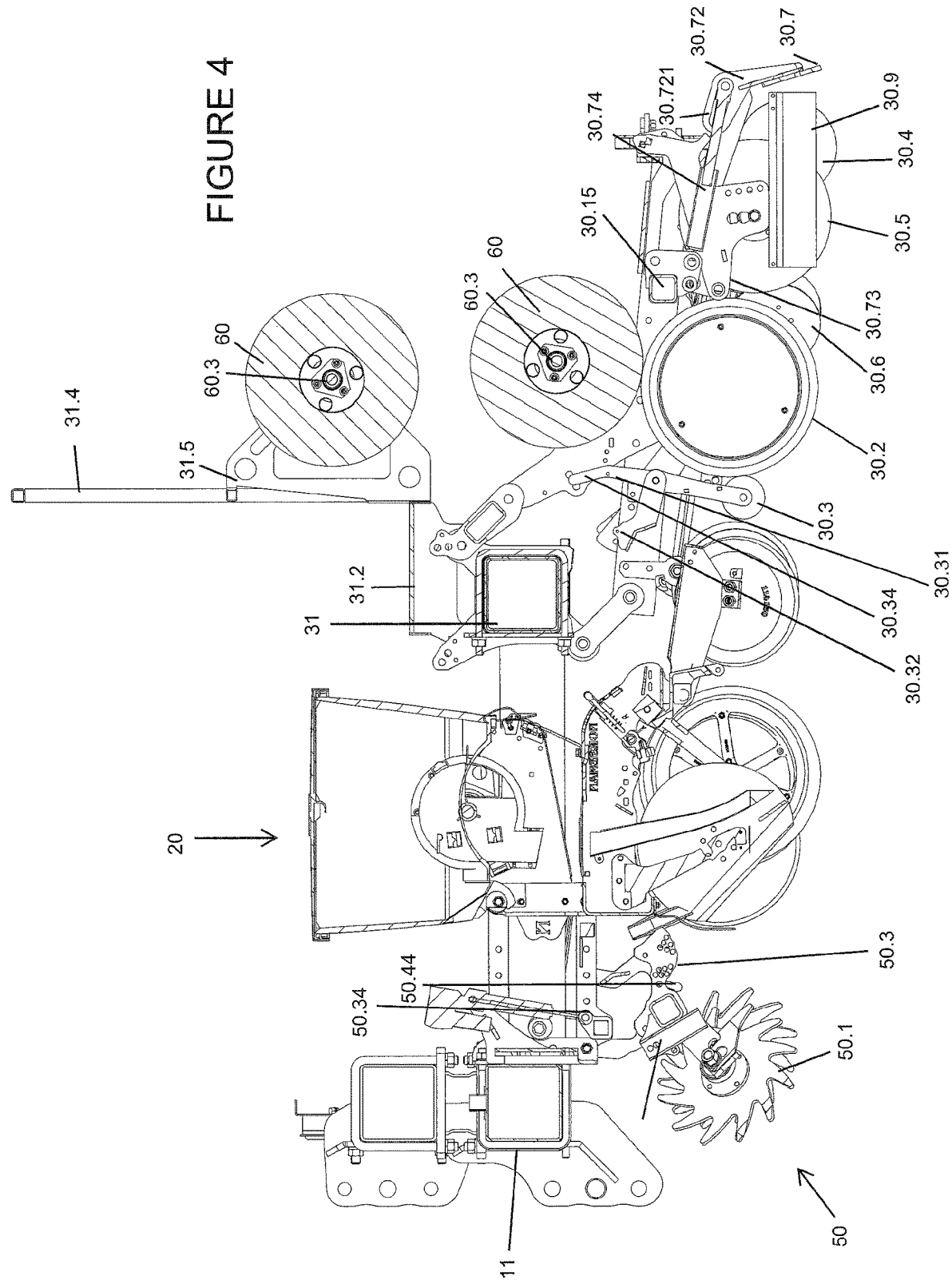
FIG. 4 illustrates a middle cross section through the of one row seed planter and film deployment system of FIG. 1, through a longitudinal vertical plane.

As best illustrated in FIG. 4 the biased and idling film locating roller 30.3 is biased by means of a tension spring (not illustrated) that is mounted to aperture 30.31, which is locate just below a handle portion 30.34, with the tension spring having its other end located in aperture 30.32 which is located on a stationary portion of the frame 30.1. The idling character of the roller 30.3 allows it to only rotate when the roller 30.3 is rotating, (when film is between them or when it is not) which in turn rotates the roll 60, all at the same speed thus applying no forces or friction to the film which o would otherwise cause it to tear.

Figure 3:
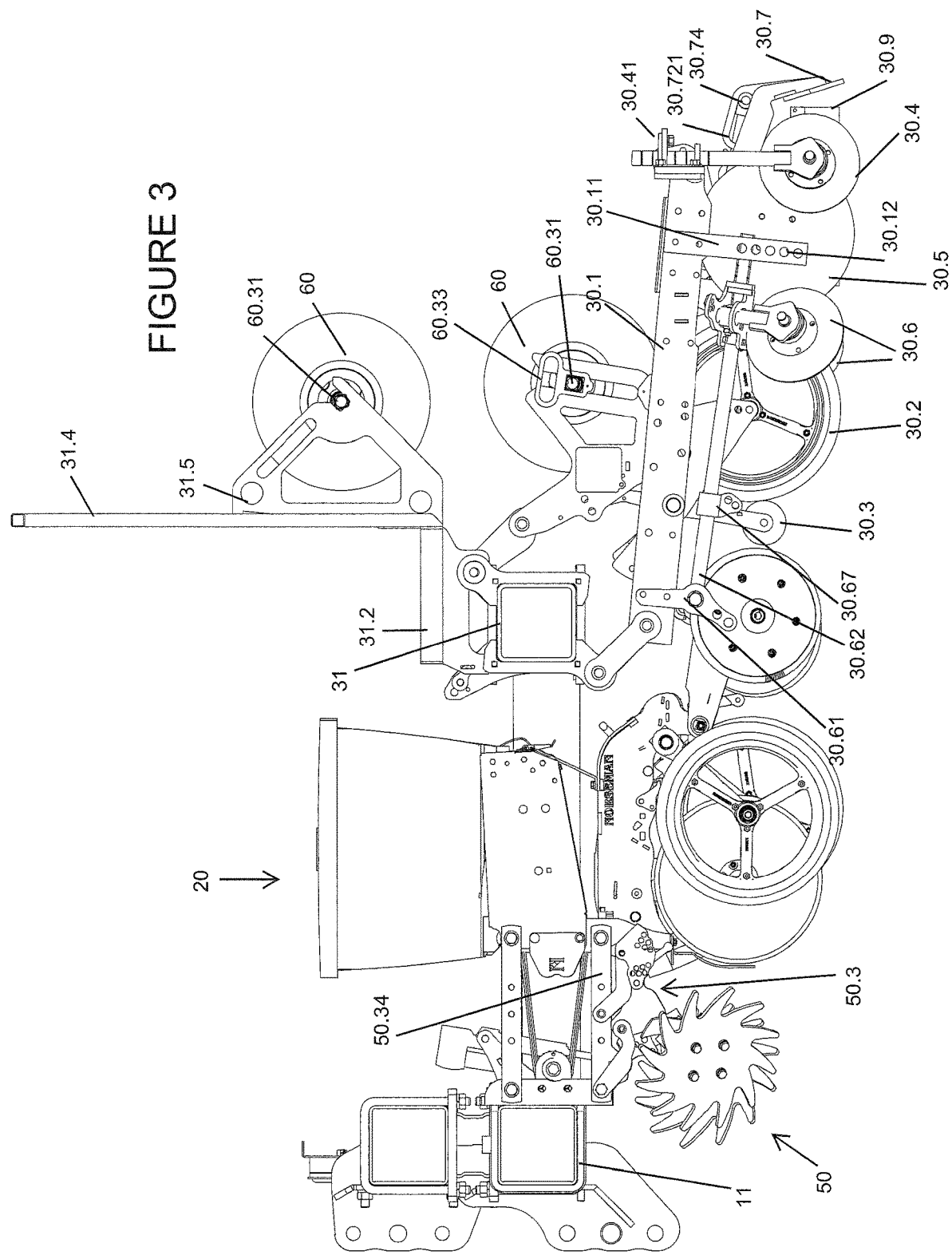
FIG. 3 illustrates a side view of the apparatus of FIG. 1.

The film deployment system 30, as best illustrated in FIGS. 2 and 3 has a ground engaging film roller 30.2 as described above, which is rotationally mounted to the frame 30.1 by its axle 30.25. The ground engaging film roller 30.2 receives film from the closest film roll 60 above and receives it at a front location of the ground engaging film roller 30.2.

The film passes between the film locating roller 30.3 and the ground engaging roller 30.2, with the ground engaging roller 30.2 shaping the ground it engages by forming a channel in ground at the opposed ends 30.21 of the roller 30.2 for the film to be located in, as it leaves engagement with the ground engaging roller 30.2.

The shape of the channel formed by the ends 30.21, will be dependent upon the shape of those ends. Thus in the roller of FIGS. 8 to 10, a channel with rounded sides will be formed depending upon the soil conditions, whereas with the ends 30.21 of roller of FIGS. 11 to 13 a channel with an outboard straight side and an inboard inclined side will be formed depending upon the soil conditions.

Figure 6:
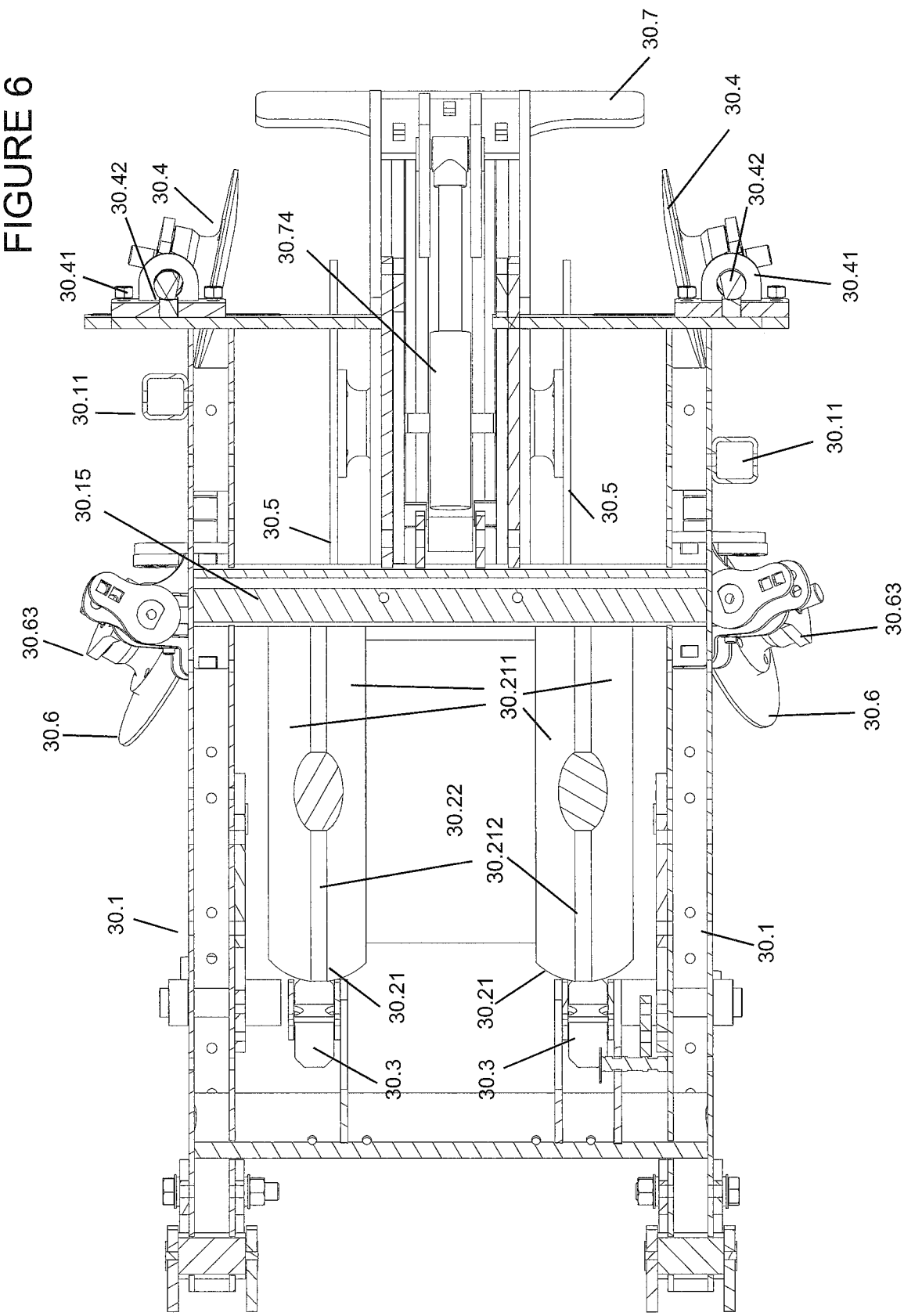
FIG. 6 illustrates a section view of the system of FIG. 2 through a horizontal plane located at a height which is near to the uppermost periphery of the ground engaging roller.

As best illustrated in FIG. 6, but visible in FIGS. 1 and 2, near to the ground engaging roller 30.2 and spaced therefrom so no contact is made, are two insertion discs 30.5, which are adapted to simultaneously form a deeper channel in the channel made by said ground engaging roller 30.2 and to push the film into the deeper channel. The insertion discs 30.5 will be noted to be of solid construction, such as cut from 8 or 10 mm steel plate or comprise a side wall of sheet material if they were fabricated. The insertion discs are mounted for rotation on the frame 30.1 by bearing mounting brackets 30.51 which are best seen in FIG. 2, which are suspended from the upper end of the rear of the frame 30.1 and which extend downwardly therefrom. It will be noted from FIG. 6 that the respect insertion discs 30.5 travel behind the roller 30.2 just in board of the centre flat portion 30.212.

The insertion discs 30.5 present a surface against which soil can be moved against, so that the moved soil does not move to a location in between the insertion discs 30.5, which is where seeds will have been planted or other process may have been performed if a seed planter were to be replaced by another process implement.

Figure 23:
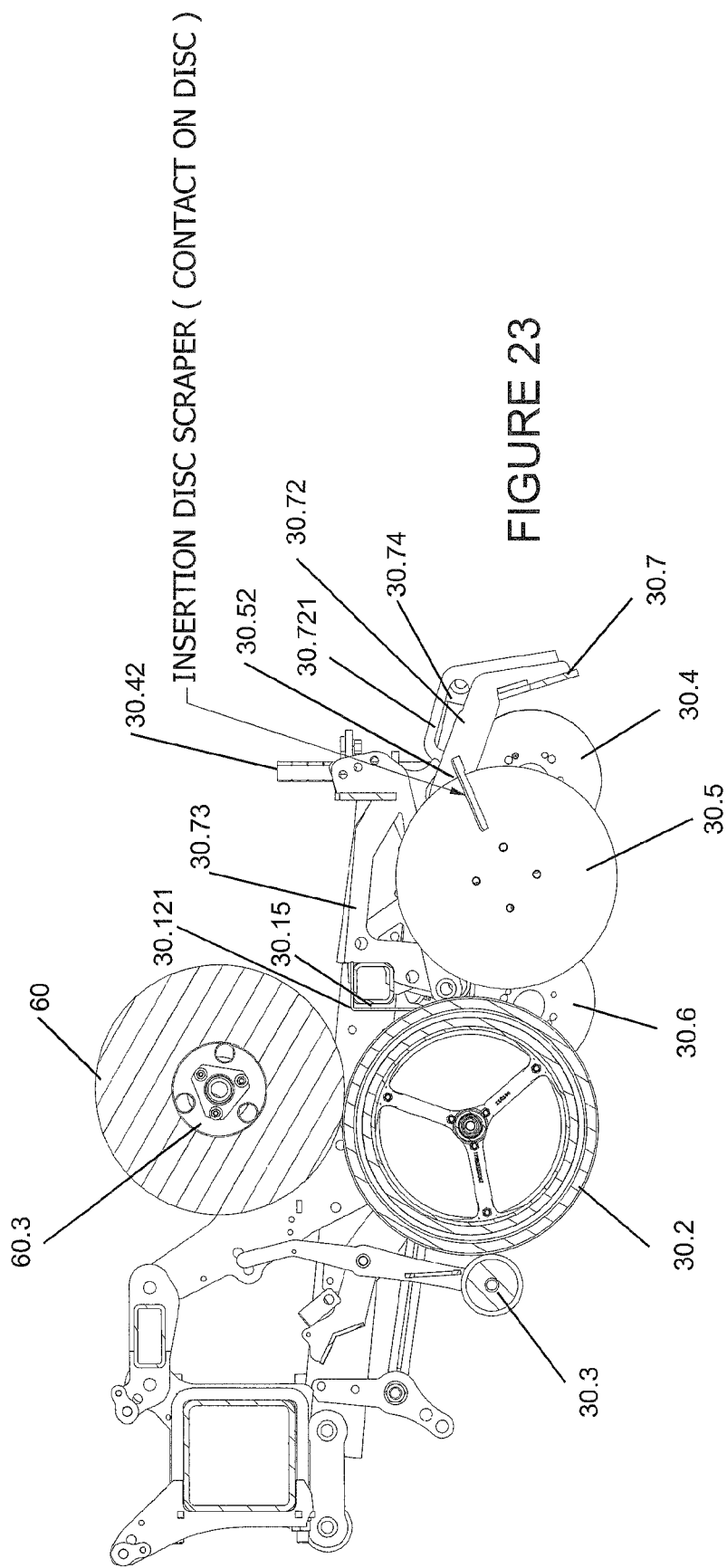
FIG. 23 is a cross section through the film deployer to show how and where the disc scraper is located relative to the insertion disc.
Figure 24:
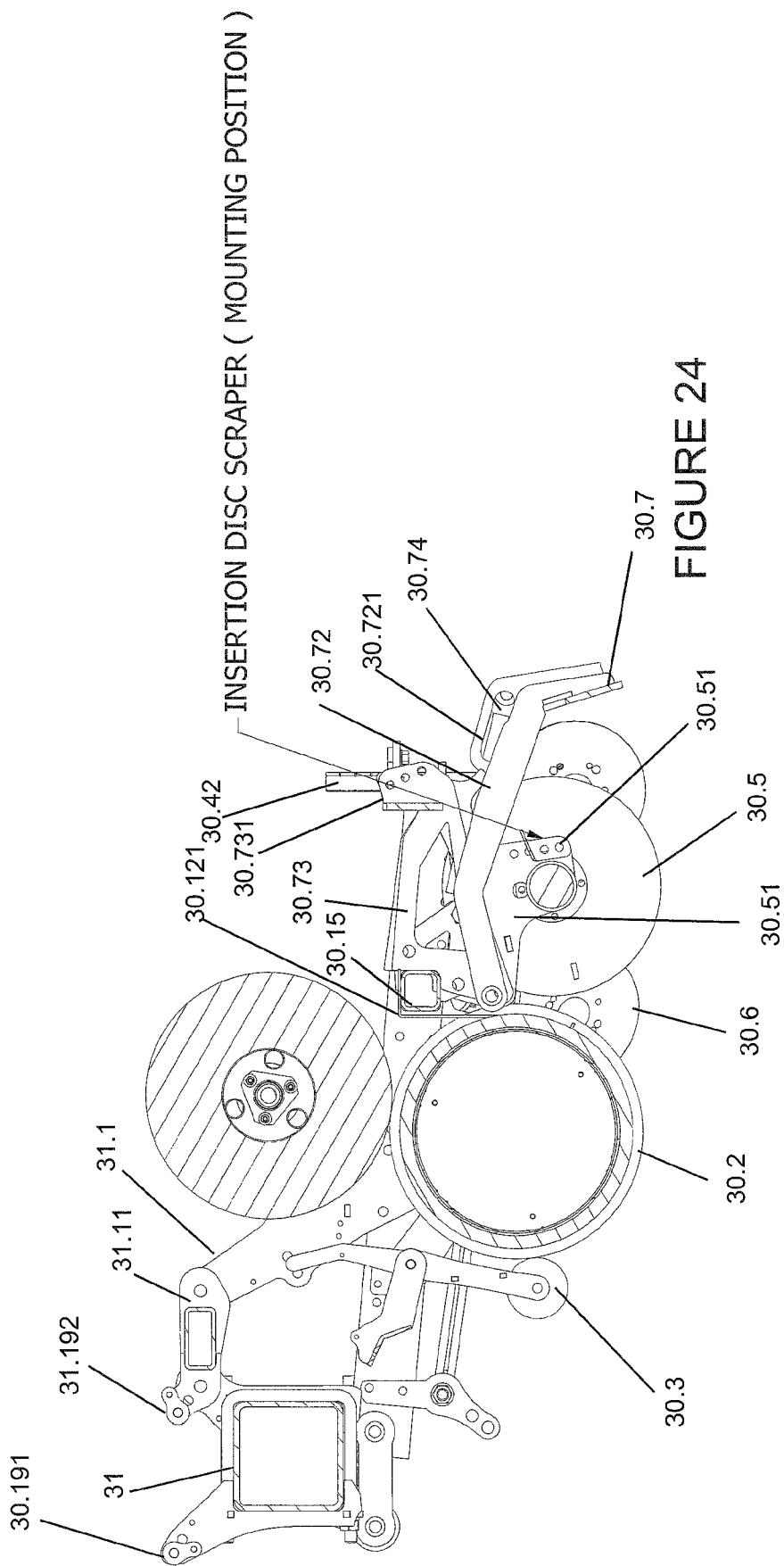
FIG. 24 is a cross section through the insertion disc receiving bracket and shows the scraper mounting portion on that bracket.

As the insertion discs 30.5 have their outboard surfaces in contact with soil, then soil on these outboard surfaces can stick and build up. However, to prevent soil build up and to promote correct operation of the discs, scrapers 30.52, as best illustrated in FIGS. 23 and 24 are mounted to the disc mounting bracket 30.51 in engagement with the discs 30.5, at the rear outboard side thereof, so that scraped off soil will fall to the ground. By mounting the scrapers 30.52 to the same bracket 30.51 as mounts the insertion disc 30.5, will maintain the positional relationship between the insertion disc 30.5 and the scraper 30.52, as the insertion disc 30.5 is adjusted through its range of motion.

As the frame 30.1 is moved along the ground, there are one or more coulters 30.6 arranged on the frame 30.1 so that soil not covered by the film is moved towards the edges of the film and engage the outboard faces of the insertion discs 30.5. The soil is thereby prevented from moving inwardly past said discs 30.5, and will fill the channel formed by the roller 30.2 and insertions discs 30.5 and thereby overlie and hold the edges of the film captive in the ground.

Depending upon soil conditions, as shown in FIG. 1 additional shielding can be provided in the form of shielding brushes 30.9 which are mounted on the frame 30.1 and sit immediately inboard of the inboard surface of the insertion discs 30.5. The brushes 30.9 are mounted to the frame 30.1 by being mounted to the rear of the brackets 30.51 which mount the discs 30.5 to the frame 30.1. The height or depth of this bracket 30.51 is adjustable, as best seen in FIG. 2, where the brackets 30.51 have 2 mounting apertures 30.511. The two mounting apertures 30.511 cooperate with the three apertures 30.731 on the rear frame brackets 30.73 to which the spade 30.7 is pivotally mounted, as best illustrated in FIG. 2 and the section view of FIG. 24. The alignment of one of the two apertures 30.511 with one of the three apertures 30.731 allows for a multiple of number of hole alignments each being a possible height setting for the insertion disc 30.5, relative to the frame 30.1.

Preferably there is only one forward coulter 30.6 on each side of the frame 30.1. The coulter 30.6 as best seen in FIGS. 2 and 3 is mounted to the frame by means of a yoke 30.61 which connects to the underside of the frame 30.1 and has provision to receive a bearing end of arm 30.62, which extends from the yoke 30.61 to the frame's rearward vertical post 30.11, which is located approximately in line, when viewed from above as in FIG. 6, with the axis of rotation of the discs 30.5.

The rear end of the arm 30.62 engages the post 30.11, so that an operator can choose the height on the post, depending say upon soil conditions or tractor speed, below which the arm 30.62 will not go, by means of the series of holes 30.12 in the posts 30.11 which can receive an laterally extending pin to act as a stop. Additionally the arm 30.62 includes a bracket 30.67 best seen in FIGS. 1 and 3, which together with a lower hole on the yoke 30.61, allows a tension spring to be connected between, so as to apply a downward bias to the arm 30.62 and thus the coulter 30.6.

The coulter 30.6, as best seen in the FIGS. 1 and 3, is mounted to the arm 30.62 by means of a bracket 30.63 having a downwardly extending axle mount 30.65 the upper end of which provides the toe parameter control or setting, and bracket 30.6 which provides the camber parameter control or setting.

The coulter 30.6 is best described as a covering coulter and moves soil in an inboard direction for filling in the channel or channels formed by the roller 30.2 and the insertion discs 30.5. Another pair of coulters 30.4, one on either side of the frame 30.1, are mounted to a rear face of the frame 30.1 by means of a bracket 40.41 which adjustably carries the coulter mount 30.42, which rotatably mounts the coulter 30.4 by its axle. The bracket 30.41 allows ration of the mount 30.42 so that the toe parameter can be controlled or set. The second pair of coulters, namely shaping coulters 30.4 may not be required in all applications of the implement 30, such as in dryland crops or for non-furrow irrigation or overhead irrigation. Additionally, there may be situations where the second pair of shaping coulters 30.4 could be used as a firming mechanism for the soil on top of the film in a "flat" land application.

As best illustrated in FIGS. 1, 2 and 6 it can be seen that the coulters 30.6 and 30.4 are discs with round circumferences for use in dry land applications. Whereas in FIG. 7, in an alternative embodiment, the coulters 30.6 and 30.4 whilst still being generally disc shaped have scalloped cut-outs around the periphery giving a castellated appearance, and somewhat more rake or cupping on the coulter, for use in furrow or irrigation formations. It will be noted that the covering coulters 30.6 in FIG. 7 present the cupped side of the coulter 30.6 towards the soil being engaged, while the shaping coulters 30.4 present the convex side of the coulter to the soil being engaged.

Figure 7:
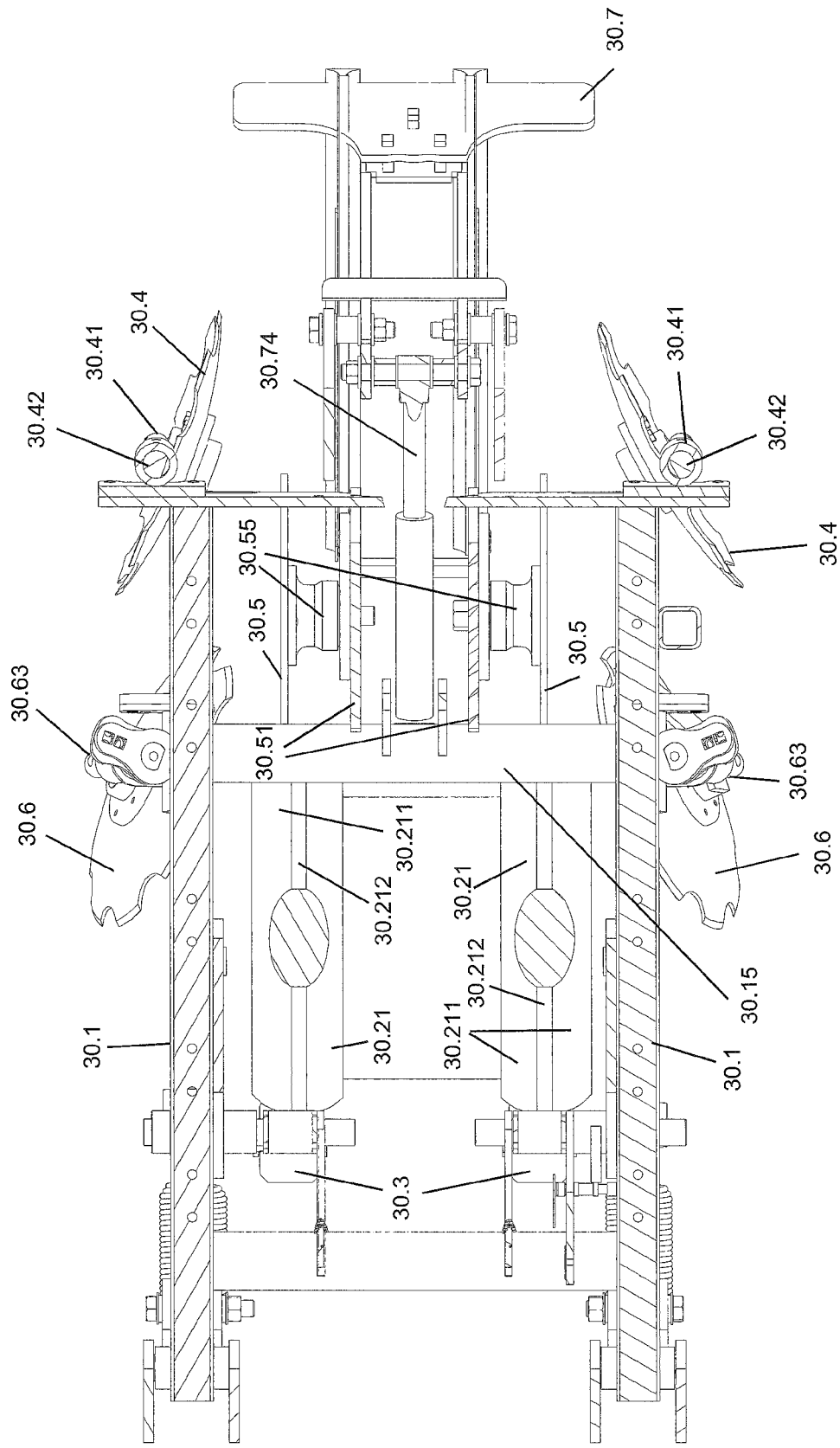
FIG. 7 illustrates a section view similar to FIG. 6 of a deployment system which has some modifications as compared to FIG. 6.

It will also be noted that the insertion discs 30.5 in FIG. 7 are located just outboard of the centre of the ends 30.21 of the roller 30.2. The position of the insertion discs 30.5 in FIG. 7, and for example their location as in FIG. 6, is controlled by means of shims (not illustrated) and selecting the bearing mounts 30.55 to have a height or length from bracket 30.51 which positions the insertion discs 30.5 where required, depending upon crop type, terrain shape, wind conditions and soil conditions. The further apart the two insertion discs/rotary shields 30.5 are set apart means that a wider section of film is not obstructed by covering soil, but also a lesser securing width of film is covered by soil. Whereas the closer that the discs 30.5 are set together means a lesser unobstructed width of film is laid, but a wider width of the sides of the film that is covered by moved soil, and thus a better anchoring of the film.

At the rear of the frame 30.1 there is located a film engaging spade 30.7 which is adapted to engage and or sever the film when actuated by an operator or control system. The spade 30.7 is preferably of a width which is approximately equal to the width of the film roll 60. The spade 30.7 is pivotally mounted to the front of the bracket 30.72 which is suspended from the frame 30.1, and a hydraulic cylinder 30.74 extends and retracts, to lower or raise the spade 30.7, relative to its stationary mount to the rear of frame 30.1 with the rear end of the cylinder 30.74 being mounted to elongated mounting holes 30.721, which are best seen in FIG. 2. The Elongated mounting holes 30.721 have a function in how the spade 30.7 operates. The spade 30.7 allows an operator, at the start of a film laying run over a ground to which it is to be applied, will start the run with the spade 30.7 held hard to the ground. The elongated slot 30.721 functions so that the soil in front of the blade 30.7 is not released all at once but gradually as the rear end of the piston (or cylinder) of the hydraulic actuator 30.74 makes its way to the front of the slot 30.721. The spade 30.7 floats along the surface of the film and soil ahead of it, until the cylinder reaches the front of the slot 30.721 and continued retraction of the hydraulic actuator 30.74 results in the lifting of the spade 30.7 into a storage or transport position. This action can happen relatively very quickly (some 2-3 seconds) and results in a low profile and positive start to the film laying or deploying run. If the film were to otherwise be covered by a big pile of soil, the film's breakdown will be slow and additionally big piles of soil at the start of the run can be problematic for subsequent operations (irrigation, cultivations, picking or harvest).

The deployment system of implement 30, as illustrated in FIGS. 2 and 6 and 7, can be considered to be a stand-alone film deploying implement which is adapted to deploy film and can be attached to a tool bar in a series of whatever number is required. Whereas in the illustrations of FIGS. 1 and 3 the deployment system of implement 30 can be trailed behind a seed planter. As discussed above, it can also be trailed behind another agricultural process or a horticultural process implement.

Figure 5:
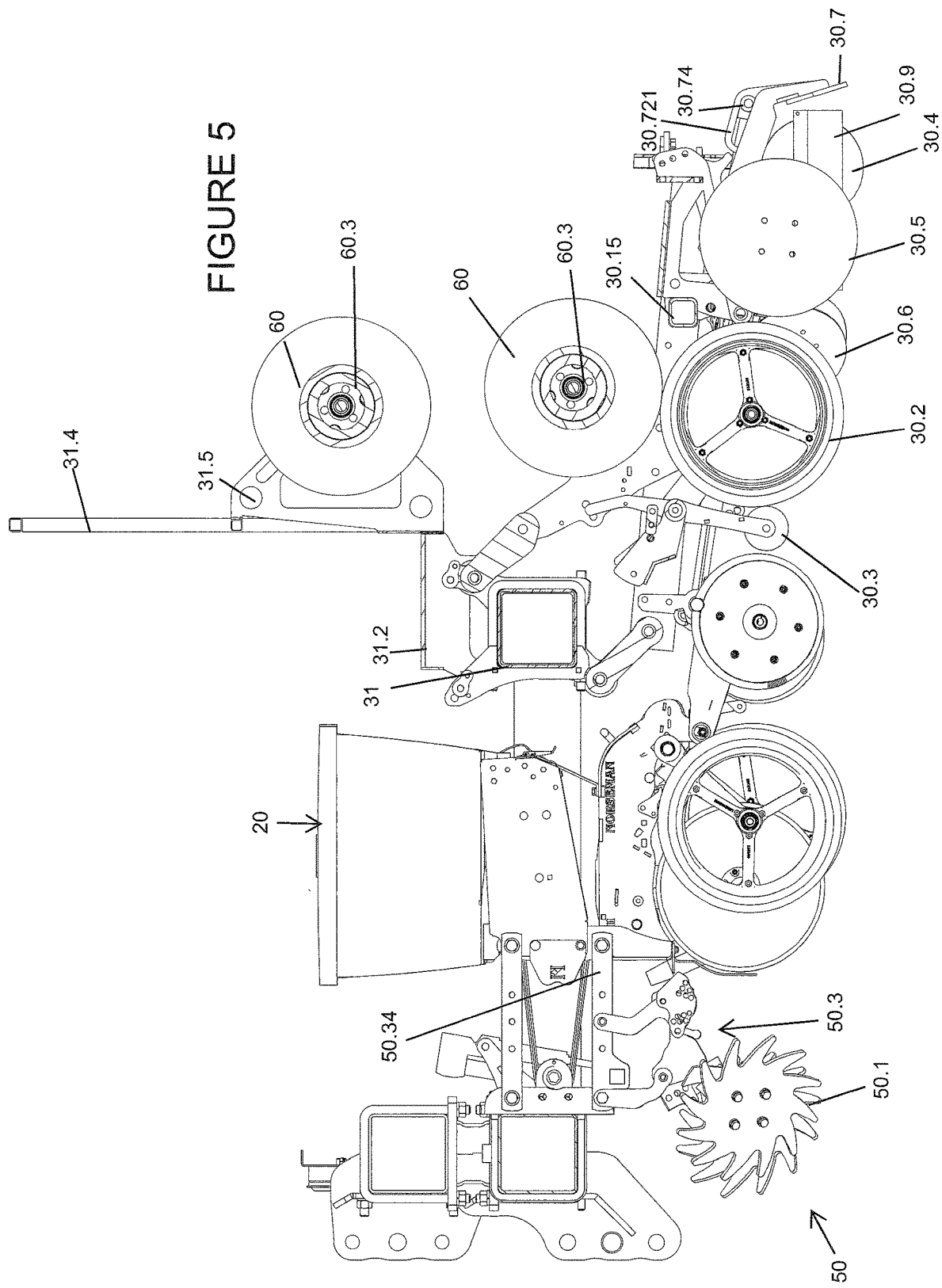
FIG. 5 illustrates a another cross section through the of one row seed planter and film deployment system of FIG. 1, through a longitudinal vertical plane located just outboard of the insertion disc.

As best seen in FIG. 5 to 7, the mounting of the frame 30.1 has associated with it weight pin or load cell mechanism which detects how much stress and thus weight is being applied to the frame, and thus carried and or applied to the ground by the film deployment implement. The weight pin or load cell sends a feedback signal to a solenoid for an implement engaging hydraulic cylinder to apply a desired force or weight to be carried and or applied to the ground. The hydraulic cylinder (not illustrated) will be mounted, as best seen in FIGS. 2 and 24, between an aperture 30.191 on the relatively stationary tool bar 31 and an aperture 31.192 which is on the upper most link 31.11 of four bar linkage 31.1. By the hydraulic cylinder extending the link 31.11 will rotate clockwise, as in FIG. 25, lowering the frame 30.1 keeping the angle of orientation of the components of the deployer 30 relative to the ground generally constant.

Figure 20:
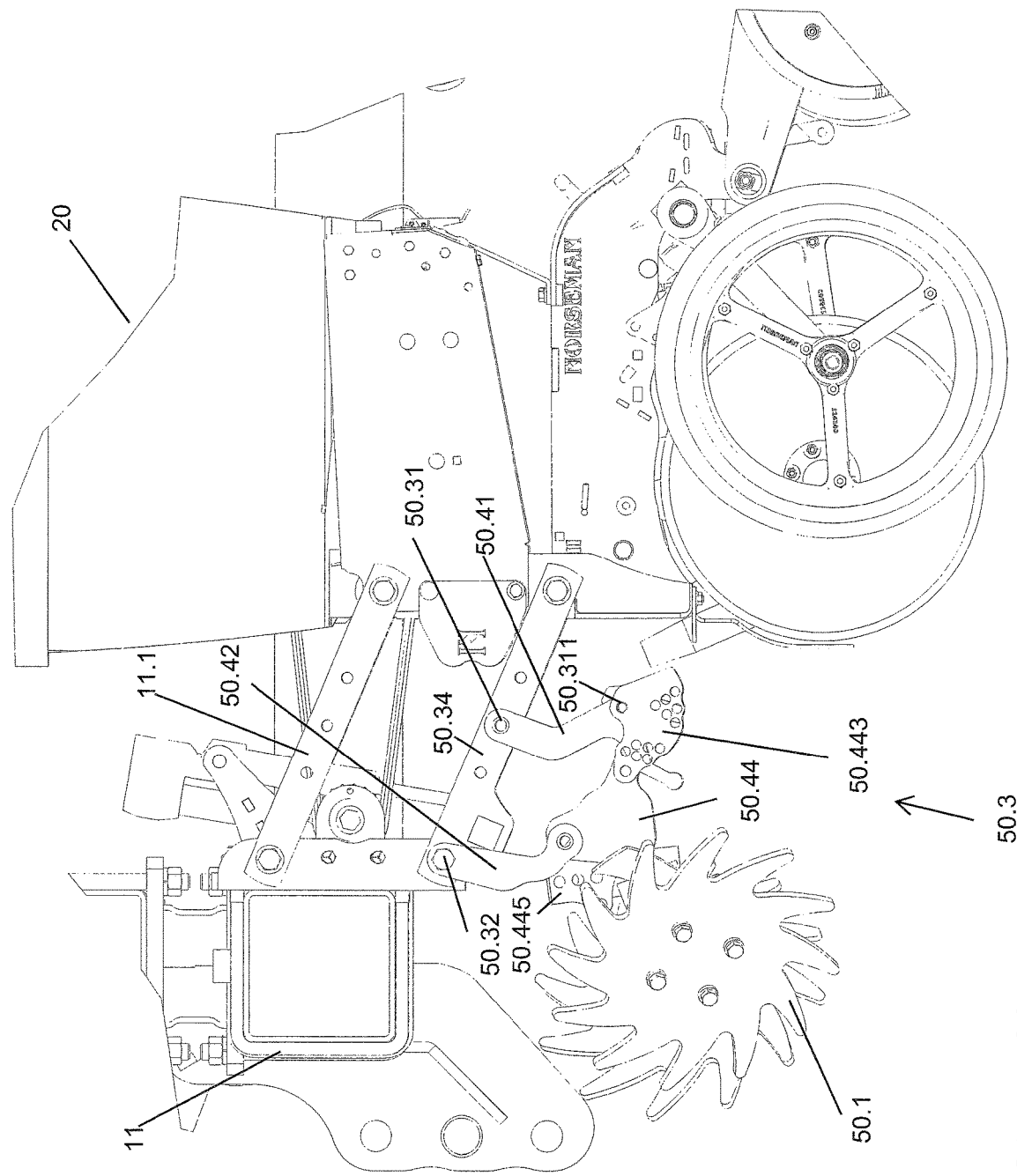
FIG. 20 is a partial close up side view of FIG. 15 showing the transport position of the trash whipper and its four bar linkage.
Figure 21:
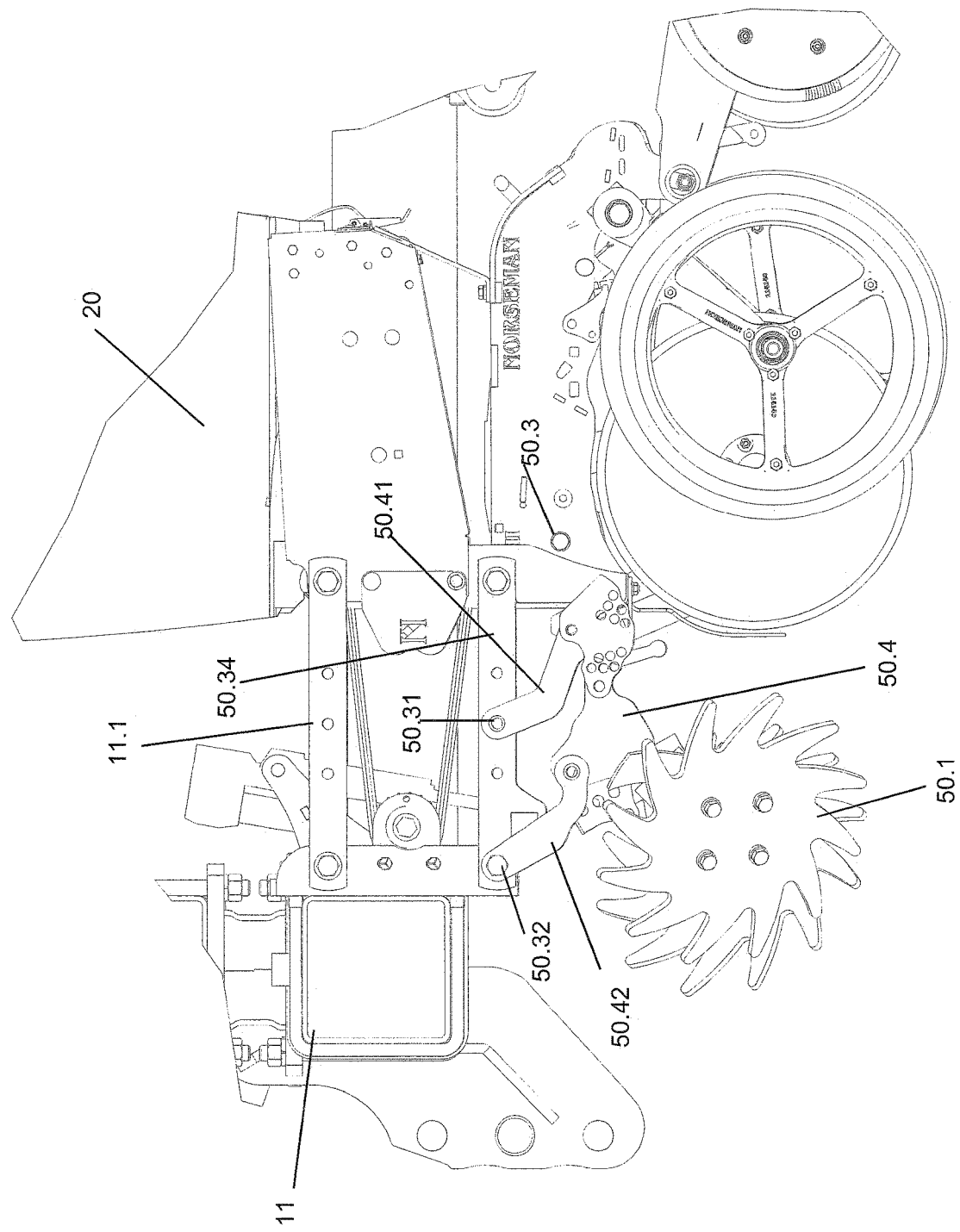
FIG. 21 is a partial close up side view of FIG. 15 showing the working position of the trash whipper and its four bar linkage.
Figure 22:
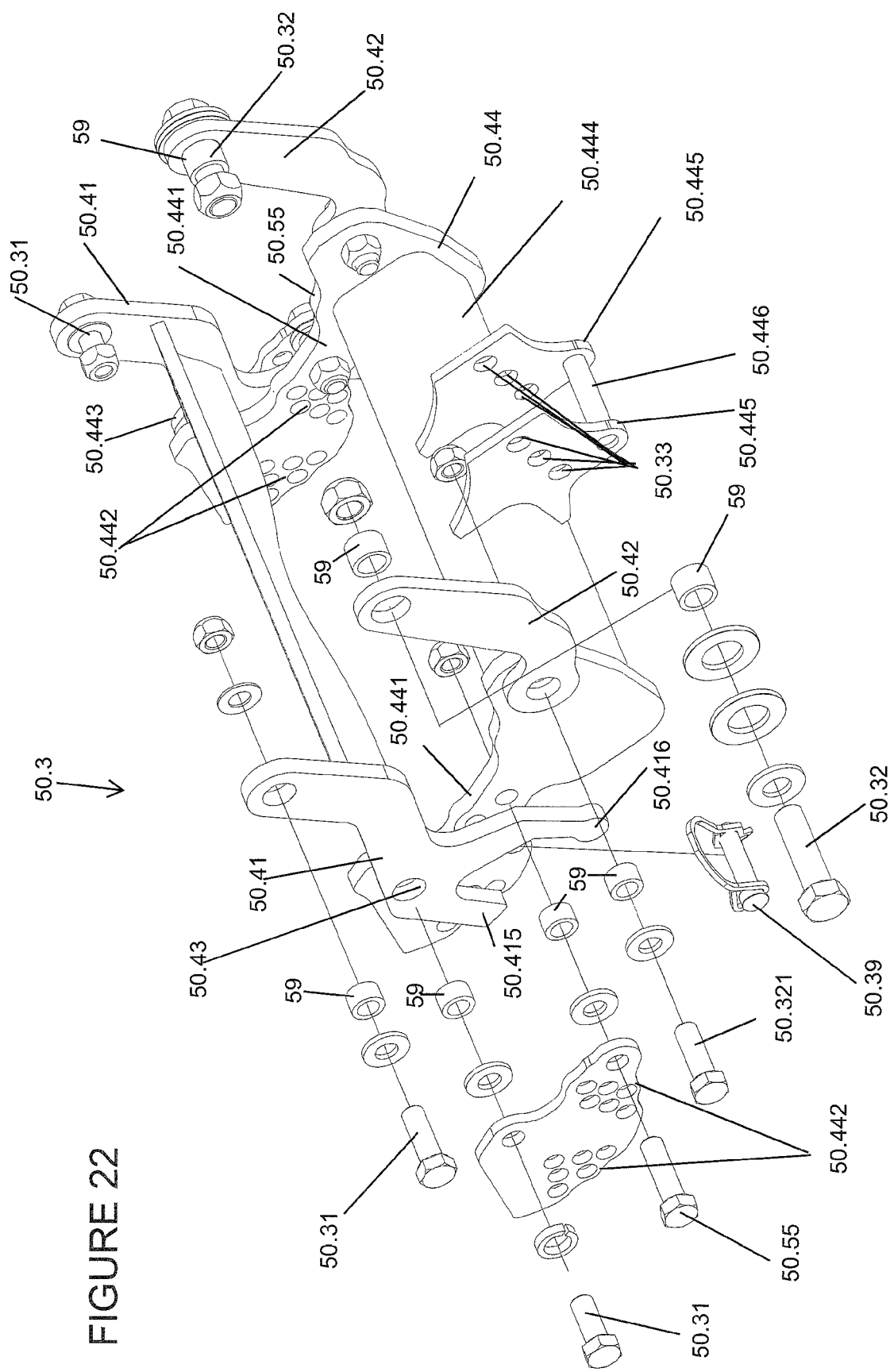
FIG. 22 is a front left side exploded perspective view of the trash whipper four bar linkage mounting.

As illustrated in FIGS. 1, 3, 5 and 14 to 22 is a trash whipper arrangement 50 which has a pair of angularly oriented ground engaging whipper coulters 50.1, which are mounted to a forward end of a pivoted four bar linkage 50.3 (as best illustrated in FIG. 22) which has two or two sets of stationary pivots 50.31 and 50.32 mounted to a support 50.34 which carries the whipper arrangement 50, which when in use has the two stationary pivots 50.31 and 50.32 located in a generally horizontal plane.

The four bar linkage 50.3 in use, moves the coulters 50.1 both rearwardly and upwardly relative to the support 50.34 in the event that the whipper 50 in use engages an obstacle, or because of forces generated by the whipper coulters 50.1 passing through the soil.

The coulters 50.3 of the whipper arrangement 50 are arranged to rotate around axes of rotation which are at a downward angle to the horizontal plane and have a component of direction which extends in the direction of movement of the arrangement when it is moving forward through soil.

The whipper coulters 50.1 include one or more teeth 50.11 on an outer circumference thereof. There are preferably 12 teeth 50.11 which are raked or extend from the coulter 50.1 at an angle to a radius of the coulter 50.1 passing through the tip of a tooth 50.11.

The respective axes of rotation of the whipper coulters 50.1 are set so as to provide a surface of the whipper coulter which will act as an inclined plane in the direction of travel through the soil, which will function to apply a lifting force to the coulters. This will be counterbalanced by the weight of the whipper arrangement 50, which will keep the whipper coulter 50.1 engaging the soil at an appropriate depth. The angle of the axes of rotation of the whipper coulter 50.1, which may be described as the angle of attack, means more of the flat face of the whipper coulter 50.1 is presented to the approaching soil thereby encouraging the rearward and upward travel of the whipper coulter system 50.

Figure 14:
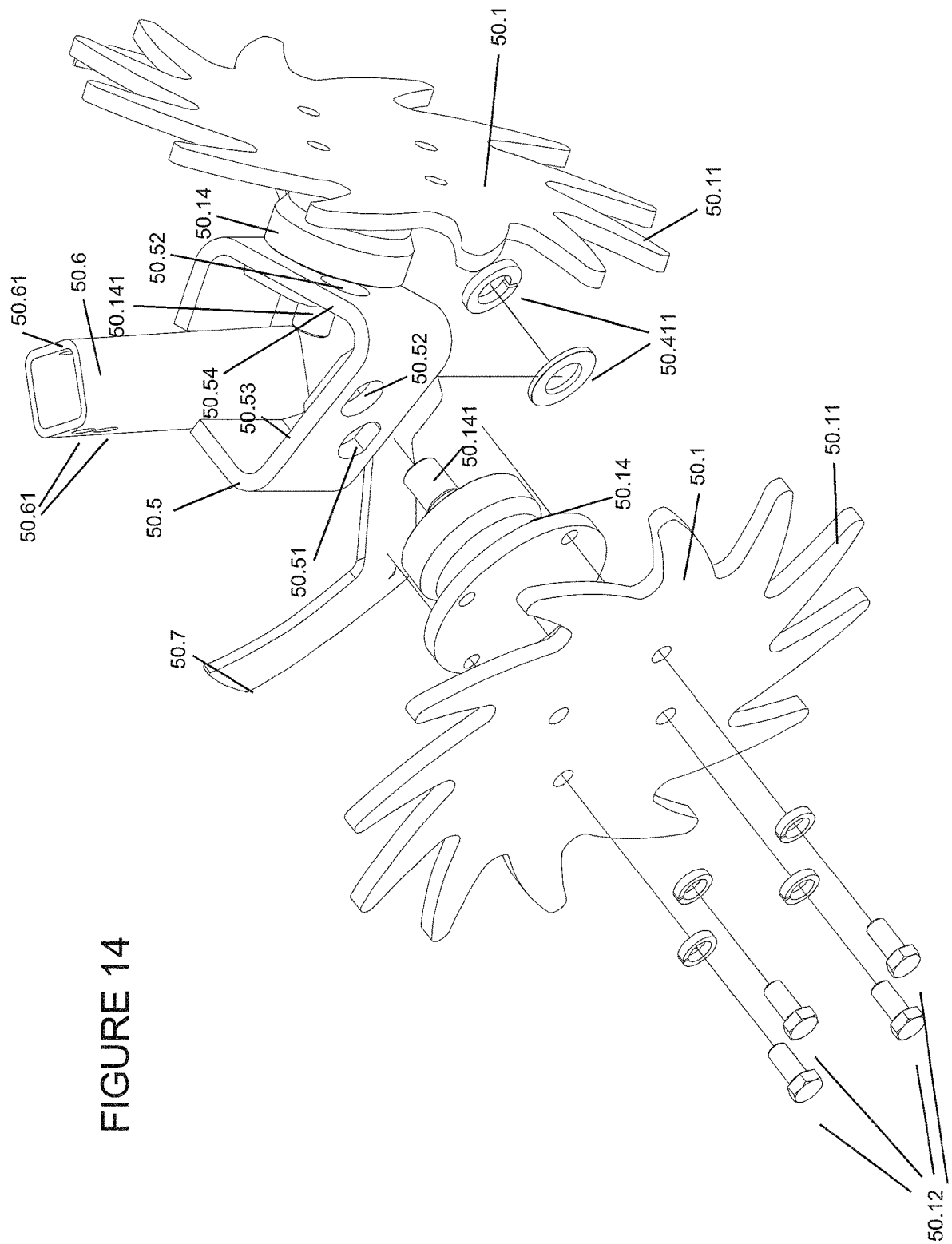
FIG. 14 illustrates an exploded view of a trash whipper mount and coulters.

As best illustrated in FIG. 14, the coulters 50.1 are mounted via four mounting bolts 50.12 to a bearing mount 50.14, which provides the axis of rotation for a respective whipper coulter 50.1, which in turn is mounted by a threaded bolt 50.141 and washers 50.411 and nut (not illustrated) to a coulter mounting bracket 50.5 which has two angled portions 50.53 and 50.54 which have a choice of apertures 50.51 and 50.52 to receive respective mounting bolts 50.141. The spacing between the apertures sets the spacing between the teeth 50.11 in the assembled whipper arrangement 50. The angled portion 50.53 and 50.54, which are angled relative to the direction of travel of the implement are welded to the base of a post 50.6, at an angle to the longitudinal direction of the post 50.6. The post 50.6 has two sets of mounting apertures 50.61 therein at the top thereof. These apertures 50.61 are spaced apart vertically so as to be in register with apertures 50.33 (see FIG. 22) on the mounting link 50.44 of the four bar linkage 50.3. The mounting holes 50.51 and 50.52, when the post 50.6 is mounted in the linkage 50.3, is such that the holes 50.51 and 50.52 will have their centres all approximately in the same plane, thus ensuring that the axes of rotation of the whipper coulters 50.1 are at approximately the same height relative to a ground datum.

Figure 15:
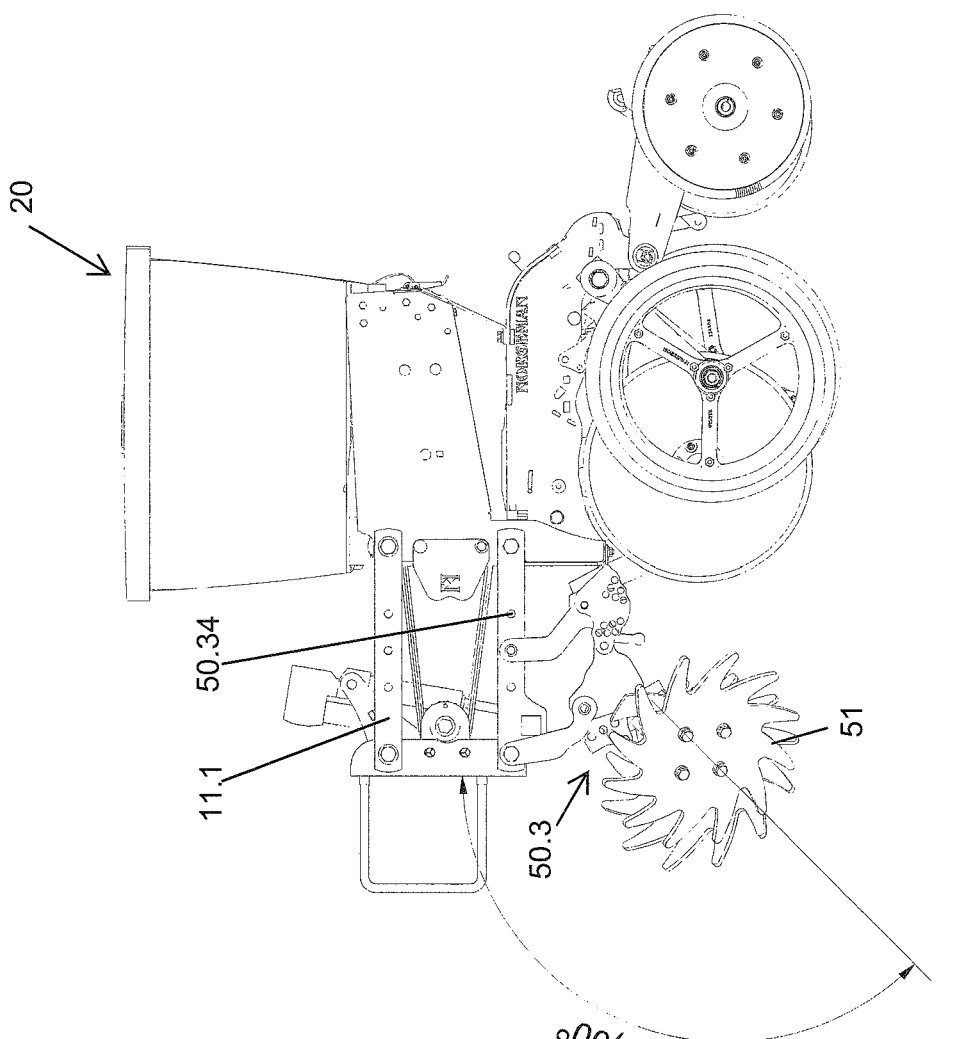
FIG. 15 illustrates a side view of a seed planter with a trash whipper having mount and coulters of FIG. 14 mounted thereto, showing the downward angle of the axis of rotation.
Figure 16:
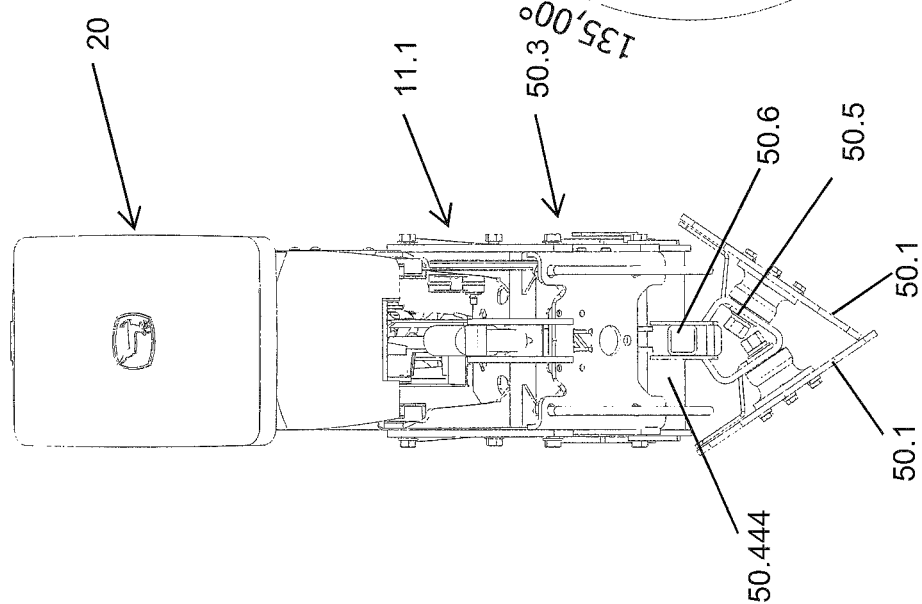
FIG. 16 is a front and upper perspective view from the plane of the coulters of FIGS. 14 and 15 of the combined seed planter and trash whipper assembly.

As illustrated in FIGS. 15 and 16 illustrates that the axis of rotation of the whipper coulters 50.1 is indicated in the side view to be of the order of 135 degrees from the vertical, or expressed another way, 45 degrees below the horizontal plane when viewed in side view. FIG. 16 shows an above view over the whipper arrangement 50, such that the planes of the coulters 50.1 are square onto the page of the illustration, and best shows the arrangement of the four bar linkage 50.3 relative to the planter's four bar linkage 11.1, to which it is mounted by common linkage 50.34.

It will be noticed from FIGS. 15 and 16 that the left side whipper coulter 50.1 in FIG. 16 is located in aperture 50.52 on bracket 50.5, while the right side whipper coulter 50.1 in FIG. 16 is located in the rear positioned aperture 50.51. This results in FIG. 15, the Left side coulter 50.1 being more forward than the right side whipper coulter 50.1. This allows the operator to set the spacing between the front of the whipper coulters 50.1 to interact with each other based on their relative positions to each other, to best cope with the nature of the trash that may be present, as different trash and processing of it can be required for different types of crops.

Illustrated in FIG. 22 is an upper perspective exploded view of the components of the four bar linkage 50.3. The relatively stationary linkage 50.34 of the four bar linkage 50.3 is not illustrated as it is a common linkage with the planter's four bar linkage 11.1. The linkage 50.44 to which the vertical post 50.6 of FIG. 14 is mounted, is constructed from a horizontal square hollow section 50.444, to which the post mounting brackets 50.445 are welded. Between the brackets 50.445 is a spacing pin 50.446, which serves to hold the forward ends of the brackets 50.445 in a spaced apart relationship, thereby making it easy to insert the post 50.6, and remove it when needed.

Welded to the ends of the section 50.444 are identically sized and shaped plates 50.441 which extend rearwardly from the section 50.444. The plates 50.441 include a forward pivot hole to receive respect forward lower pivot 50.321, which respectively joins linkage 50.44 to respective forward linkage 50.42.

The rear end of the plates 50.441 each have a series of holes 50.442 and a pivot mounting hole which is obscured but which corresponds to the pivot 50.311 receiving aperture 50.413 on the rear link 50.41. The apertures 50.442 and 50.443 correspond to a series of holes 50.442 on outboard plates 50.443. Once the lower pivots 50.311 are assembled, and bolt 50.55 is assembled through plate 50.443 and 50.441, the link 50.41 will be sandwiched therebetween, and a shear pin 50.39 having a pin lock, can be passed through form plate 50.443 to 50.441, and the travel of the four bar linkage 50.3 can be limited and changed according to soil conditions, by passing the shear pin 50.39 through other pairs of corresponding holes 50.442. This arrangement limits the travel upward or downward of the linkage 50.3 depending upon which leg of link 50.41 is engaged, and which side of respective leg is to be engaged by the pin 50.39.

The links 50.41 have a bifurcated lower end with downwardly extending legs 50.415 and 50.416, so that the whipper coulters 50.1, once attached by the post 50.6 to the four bar linkage 50.3, can be positioned to the correct height for the soil conditions in which the whipper 50 is going to be used.

It will be noted that the respective "vertical" links 50.41 and 50.42 have a "dog leg" or offset, when compared to a straight linkage where the pivot mounting and assembly holes have their centre on the longitudinal axis of the linkage. The "dog leg" or offset is provided so that the four bar linkage will not interact or contact with seed planter components which would otherwise be contacted but for the dog leg or offset.

As can be seen from FIG. 22, the four bar linkage 50.3 is assembled with bolts and self-locking nuts, such as Nylok nuts, and bushings 59, as is commonly known in engineering assemblies.

Figure 19:
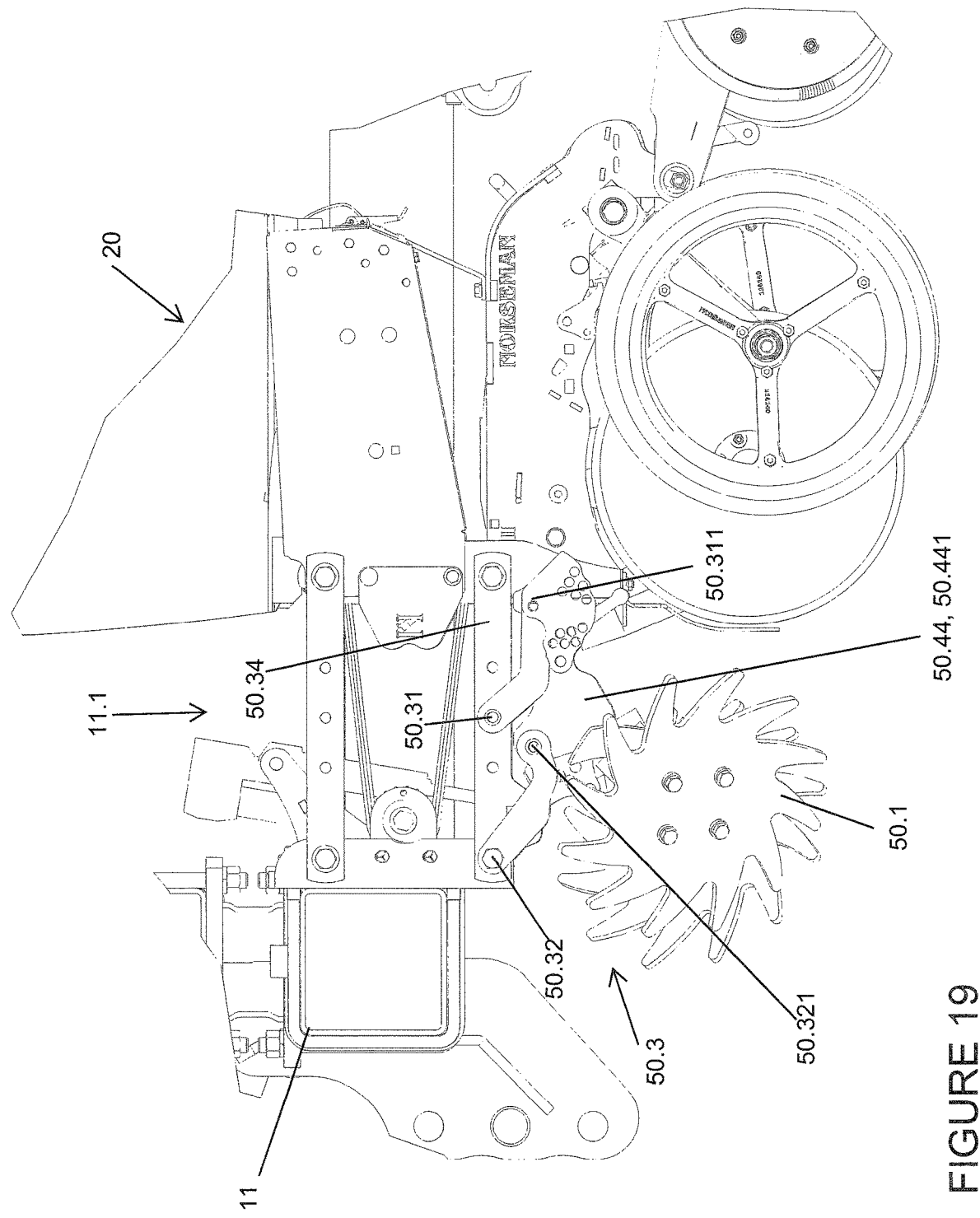
FIG. 19 is a partial close up side view of FIG. 15 showing the break out position of the trash whipper and its four bar linkage.

By comparing FIG. 15 or 18, which shows the four bar linkage 50.3 at a first working condition, with the linkage 50.3 in FIG. 19 which is shown in a break out position, the transport position in FIG. 20 and in FIG. 21 a second working condition. It will be noted from the respective Figures that the planter's four bar linkage 11.1 is generally level in all but the transport position of FIG. 20, whereas in the working and break out positions of FIG. 15 or 18, 19 and 21, the link 50.34 of four bar linkage 11.1 is in a generally horizontal orientation, such that the two upper pivots in the linkage 50.3 are in a generally horizontal plane, which are held relatively stationary as the linkage 11.1 is generally stationary in the break out and working conditions.

Figure 25:
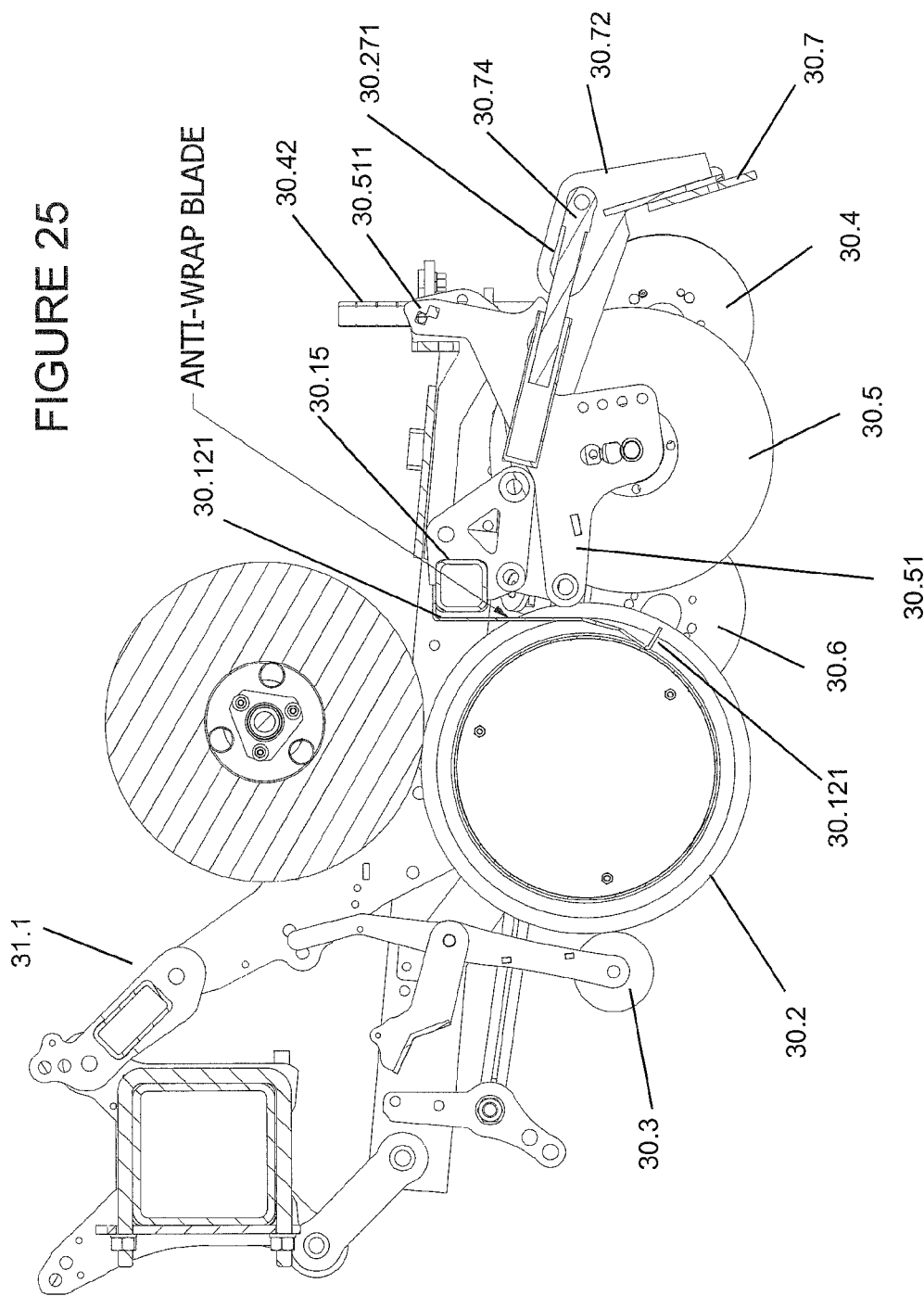
FIG. 25 is a cross section through the film laying implement 30, showing the location and shape of an anti-wrap blade.

As illustrated in FIG. 25, is a cross section through the centre of the implement 30, which also includes an anti-wrap blade 30.121, which assists in preventing the film from wrapping around the ground engaging film roller 30.2. The anti-wrap blade 30.121 is of a width which is co-extensive with the width of the straight section 30.22 of the roller 30.2, and is manufactured from spring steel to engage the sections 30.22, and acts as a scraper of the sections 30.22 when the roller 30.2 is rotating due to ground engagement. The anti-wrap blade 30.121 extends downwardly from a square hollow section horizontal frame member 30.15, which is part of frame 30.1. The blade 30.121 extends downwardly to the lower rear quadrant of the roller 30.2 and then inwardly to make contact with the sections 30.22 of the roll 30.2.

In the previously described embodiments of the system and implement 30 of FIGS. 1 and 2, and others, the roller 30.2 is preferably manufactured from aluminium or steel. However for lightness, aluminium is preferred. For a roll 60 of 425 mm in width the roller 30.2 as illustrated is of the order of 400 mm in width. The diameter of the roller 30.2 at the middle section 30.22 is of the order of 375 mm in outside diameter, while the ends 30.21 with the rubber tyre thereon has an outer diameter of approx. 475 mm, with the width of each tyre or rubber band being of the order of 100 mm. The insertion/rotary shield discs 30.5 are preferably of the order of 330 mm in diameter and a thickness of some 8 mm. The covering coulters 30.6 and shaping coulters 30.4 are preferably of the order of 230 mm in diameter or use in dry land applications—as illustrated in FIG. 6, or as illustrated in FIG. 7, of a diameter of approx. 355 mm where furrow irrigation rows have to have film applied to them.

The above describes embodiments of agricultural or horticultural implements (10) for performing an agricultural or horticultural process, with the implement including a whipper arrangement 50 as described above, at a location forward of where the process will be performed. The agricultural or horticultural implement 10 can be as described above, such that, to the rear of where a process is performed there can located film deployment system 30 as also described above.

The agricultural or horticultural implement 10, can be such that the process can be one or more of the following: seed planting; fertilizing; weed treatment, insecticide treatment; any other appropriate agricultural or horticultural process.

It is an advantage of the above mentioned implements, in particular when the implement is a seed planter, and has ahead of it a trash whipper as described above and a film deployer as described above following at the rear, that such an implement can be used to seed and cover with film in a zero till condition, that is no pre-cultivation is required. Additionally in the case where pre-formed furrow or irrigation systems are present the above implement can plant seed and deploy film to good effect. Additionally the above embodiments can achieve trash whipping and seed planting and film laying at a speed of around 10 to 12 kilometres per hour.

While the embodiments described above have the film deploying implement 30 located behind the trash whipper 50 and seed planter 20 in respect to a working direction of travel, there are envisaged situations that the film deployer implement 30 may be positioned between the trash whipper 50 and the seed planter 20, with the seed planter 20 planting the seed through the film deployed by the implement 30.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A film deployment system having a ground engaging film roller which has a generally horizontal axis of rotation and an outer circumference for engaging ground, said ground engaging film roller having opposed outer ends of a larger circumference than the circumference of portions located between the opposed ends, said ground engaging film roller being rotationally mounted to a frame, said ground engaging film roller receiving film from above and to a front location of said ground engaging film roller, and passing between a film locating roller and said ground engaging film roller, said ground engaging film roller shaping the ground it engages by forming a channel in ground at the opposed ends of the ground engaging film roller for said film to be located as it leaves engagement with said ground engaging film roller, wherein there is positioned near to said opposed ends of said ground engaging film roller one or more of the following: an insertion disc which is adapted to simultaneously form a deeper channel in said channel formed by said ground engaging film roller and to push said film into said deeper channel; an insertion disc the position of which is adjustable laterally so as to position same at different parts of said channel formed by said opposed ends of said ground engaging film roller; an insertion disc which cooperates with a scraper; an insertion disc which cooperates with a shielding brush; an insertion disc which follows said opposed ends of said ground engaging film roller which dictates the width of clear film left exposed above soil, after said system has passed.

2. The film deployment system as claimed in claim 1, wherein one or more coulters are arranged so that soil not covered by said film is moved towards the edges of said film and engages the outboard face of said insertion disc, the soil thereby prevented from moving past said disc, so as to fill said channel and thereby overlie and hold the edges of said film captive in the ground.

3. The film deployment system as claimed in claim 2, wherein said one or more coulters are one or more of the following: a pair of coulters on each side of said ground engaging film roller; a covering coulter on each side of said film; a covering coulter forward of said insertion discs on each side of said film; a covering coulter forward of said insertion discs on each side of said film mounted on a spring biased arm; a shaping coulter on each side of said film which is rear of the axis of rotation of said insertion disc.

4. A film deployment system having a ground engaging film roller which has a generally horizontal axis of rotation and an outer circumference for engaging ground, said ground engaging film roller having opposed outer ends of a larger circumference than the circumference of portions located between the opposed ends, said ground engaging film roller being rotationally mounted to a frame, said ground engaging film roller receiving film from above and to a front location of said ground engaging film roller, and passing between a film locating roller and said ground engaging film roller, said ground engaging film roller shaping the ground it engages by forming a channel in ground at the opposed ends of the ground engaging film roller for said film to be located as it leaves engagement with said ground engaging film roller wherein to the rear of said system there is located a film engaging spade which is adapted to do one or both of the following: engage and or sever said film when actuated by an operator or control system; secures film to a ground location at the start of a film laying run.

5. A film deployment system having a ground engaging film roller which has a generally horizontal axis of rotation and an outer circumference for engaging ground, said ground engaging film roller having opposed outer ends of a larger circumference than the circumference of portions located between the opposed ends, said ground engaging film roller being rotationally mounted to a frame, said ground engaging film roller receiving film from above and to a front location of said ground engaging film roller, and passing between a film locating roller and said ground engaging film roller, said ground engaging film roller shaping the ground it engages by forming a channel in ground at the opposed ends of the ground engaging film roller for said film to be located as it leaves engagement with said ground engaging film roller wherein said system is located in one of the following: a film deploying implement which is adapted to deploy film; a seed planter having a trailing film deploying implement or system; an agricultural or horticultural process implement having a trailing film deployment implement or system; a film deploying implement in which there is located a weight pin mechanism which detects how much weight is being carried and or applied to the ground by said film deployment implement, and compensates by application of hydraulic pressure to a hydraulic cylinder to apply a desired weight to be carried and or applied to the ground.

6. The film deployment system as claimed in claim 5, wherein said system includes one or more racks to carry replacement rolls of film to replenish said system once film has been fully deployed.

7. The film deployment system as claimed in claim 5, wherein there is positioned near to said opposed ends of said ground engaging film roller is one or more of the following: an insertion disc which is adapted to simultaneously form a deeper channel in said channel formed by said ground engaging film roller and to push said film into said deeper channel; an insertion disc the position of which adjustable laterally so as to position same at different parts of said channel formed by said opposed ends of said ground engaging film roller; an insertion disc which cooperates with a scraper; an insertion disc which cooperates with a shielding brush; an insertion disc which follows said opposed ends of said ground engaging film roller which dictates the width of clear film left exposed above soil, after said system has passed.

8. The film deployment system as claimed in claim 7, wherein one or more coulters are arranged so that soil not covered by said film is moved towards the edges of said film and engages the outboard face of said insertion disc, the soil thereby prevented from moving past said disc, so as to fill said channel and thereby overlie and hold the edges of said film captive in the ground.

9. The film deployment system as claimed in claim 8, wherein said one or more coulters are one or more of the following: a pair of coulters on each side of said ground engaging film roller; a covering coulter on each side of said film; a covering coulter forward of said insertion discs on each side of said film; a covering coulter forward of said insertion discs on each side of said film mounted on a spring biased arm; a shaping coulter on each side of said film which is rear of the axis of rotation of said insertion disc.

10. The film deployment system as claimed in claim 7, wherein to the rear of said system there is located a film engaging spade which is adapted to do one or both of the following: engage and or sever said film when actuated by an operator or control system; secure film to a ground location at the start of a film laying run.

11. The film deployment system as claimed in claim 5 and a trash whipper arrangement comprising a pair of angularly oriented ground engaging whipper coulters mounted to a forward end of a pivoted four bar linkage which has two stationary pivots mounted to a support which carries said whipper, which when in use has said two stationary pivots located in a generally horizontal plane.

12. The film deployment system as claimed in claim 11, wherein said four bar linkage moves said coulters both rearwardly and upwardly relative to said support in the event that the whipper in use engages an obstacle and or by forces generated by the whipper coulters moving through ground.

13. The film deployment system as claimed in claim 11, wherein the coulters are arranged to rotate around axes which are at an angle to the horizontal plane and have a component of direction which is in the direction of movement of the arrangement when it is moving.

14. The film deployment system as claimed in claim 11, wherein said coulters includes one or more than one of the following: teeth on an outer circumference thereof, the rotation axes of respective coulters are set so as to provide a surface of said coulter which will act as an inclined plane in the direction of travel, which function to apply a lifting force to said coulters as said coulters travel through ground.

15. An agricultural or horticultural implement wherein there is located a film deployment system having a ground engaging film roller which has a generally horizontal axis of rotation and an outer circumference for engaging ground, said ground engaging film roller having opposed outer ends of a larger circumference than the circumference of portions located between the opposed ends, said ground engaging film roller being rotationally mounted to a frame, said ground engaging film roller receiving film from above and to a front location of said ground engaging film roller, and passing between a film locating roller and said ground engaging film roller, said ground engaging film roller shaping the ground it engages by forming a channel in ground at the opposed ends of the ground engaging film roller for said film to be located as it leaves engagement with said ground engaging film roller, wherein said implement further includes a trash whipper arrangement comprising a pair of angularly oriented ground engaging whipper coulters mounted to a forward end of a pivoted four bar linkage which has two stationary pivots mounted to a support which carries said whipper, which when in use has said two stationary pivots located in a generally horizontal plane.

16. The agricultural or horticultural implement as claimed in claim 15, wherein said implement is for one or more of the following: seed planting; fertilizing; weed treatment; and insecticide treatment.

17. The agricultural or horticultural implement as claimed in claim 15, wherein said four bar linkage moves said coulters both rearwardly and upwardly relative to said support in the event that the whipper in use engages an obstacle and or by forces generated by the whipper coulters moving through ground.

18. The agricultural or horticultural implement as claimed in claim 15, wherein the coulters are arranged to rotate around axes which are at an angle to the horizontal plane and have a component of direction which is in the direction of movement of the arrangement when it is moving.

19. The agricultural or horticultural implement as claimed in claim 15, wherein said coulters includes one or more than one of the following: teeth on an outer circumference thereof, the rotation axes of respective coulters are set so as to provide a surface of said coulter which will act as an inclined plane in the direction of travel, which function to apply a lifting force to said coulters as said coulters travel through ground.

* * * * *